United States Patent [19]

Boys et al.

[11] Patent Number: 5,293,308
[45] Date of Patent: Mar. 8, 1994

[54] INDUCTIVE POWER DISTRIBUTION SYSTEM

[75] Inventors: John T. Boys, Birkdale; Andrew W. Green, Papatoetoe, both of New Zealand

[73] Assignee: Auckland Uniservices Limited, Auckland, New Zealand

[21] Appl. No.: 827,887

[22] Filed: Jan. 30, 1992

[30] Foreign Application Priority Data

| Mar. 26, 1991 | [NZ] | New Zealand | 237572 |
| Jul. 1, 1991 | [NZ] | New Zealand | 238815 |
| Sep. 19, 1991 | [NZ] | New Zealand | 239862 |
| Sep. 30, 1991 | [NZ] | New Zealand | 240018 |
| Jan. 23, 1992 | [NL] | Netherlands | 238815 |
| Jan. 23, 1992 | [NL] | Netherlands | 239862 |
| Jan. 23, 1992 | [NL] | Netherlands | 240018 |
| Jan. 23, 1992 | [NZ] | New Zealand | 237572 |

[51] Int. Cl.$^5$ ............................................ H02M 5/458
[52] U.S. Cl. ................................. 363/37; 336/118; 336/119; 336/178; 324/392; 324/402
[58] Field of Search ............... 363/37; 336/118, 119, 336/129, 175, 176, 178; 362/164, 391; 324/392, 395, 402

[56] References Cited

U.S. PATENT DOCUMENTS 3,532,934 10/1970 Ballman .
4,914,539 4/1990 Turner et al. .

FOREIGN PATENT DOCUMENTS 1418128 12/1975 United Kingdom .

OTHER PUBLICATIONS

"Inductive Power Transfer to an Electric Vehicle"; Lashkari et al; Proceedings of Eighth International Electric Vehicle Symposium; Washington D.C., Oct. 1986.

"The Roadway Powered Electric Vehicle-An All-Electric Hybrid System"; Lechner et al., Proceedings of Eighth International Electric Vehicle Symposium; Washington D.C., Oct. 1986.

"Inductive Power Transfer to an Electric Vehicle-Analytical Model", *40th IEEE Vehicular Technology Conference*, May 6, 1990, By M. Eghtesadi, pp. 100–104.

*Primary Examiner*—Emanuel T. Voeltz
*Attorney, Agent, or Firm*—Young & Thompson

[57] ABSTRACT

A contactless inductive power distribution system operating at 10 KHz has a self tuning resonant power supply connected to a resonant primary conductive path comprising a pair of parallel litz wire conductors each encapsulated within an insulated sheath and supported on a structural monorail beam on which a plurality of electric vehicles can run. Each vehicle has an electric motor capable of deriving power from a resonant pick-up coil wound on a ferrite core mounted on the vehicle in close proximity to the primary conductors. Each vehicle also has switching means capable of preventing a lightly loaded vehicle from presenting a reduced load to the resonant primary. In one version this comprises an isolating coil having a switch to switch the coil between an open circuit and a short circuit, so that when the switch is switched from one state to another state the power coupled between the primary conductive path and the pick-up coil is changed.

44 Claims, 17 Drawing Sheets

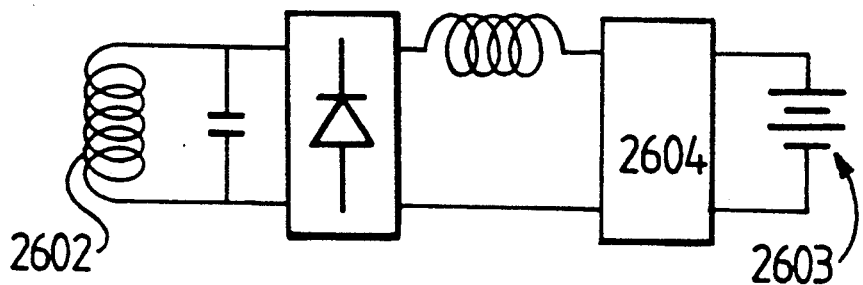
FIG. 26
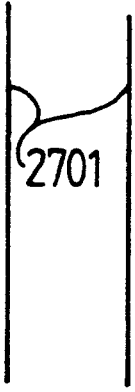
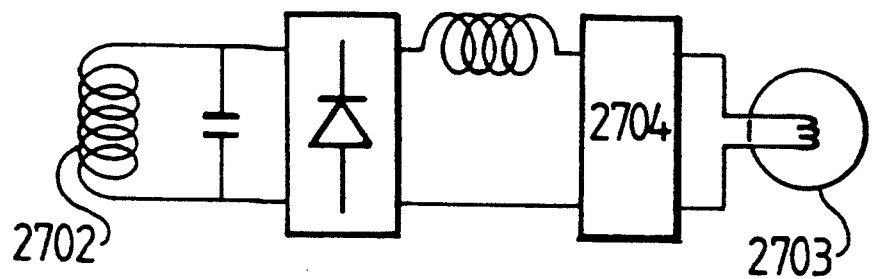
FIG. 27
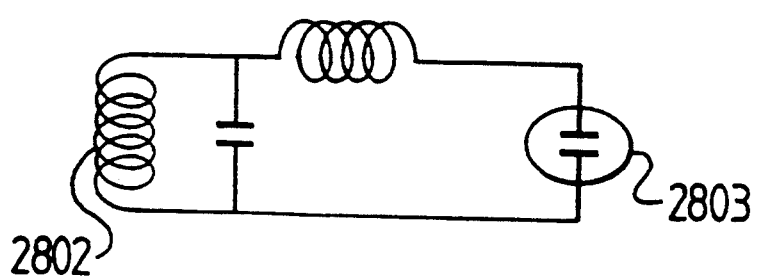
FIG. 28

INDUCTIVE POWER DISTRIBUTION SYSTEM

FIELD OF THE INVENTION

This invention relates to the distribution, then transmission across a space by wire-less inductive means, of electric power to one or more electrical devices. These devices will in most cases be mobile or portable consumers of electrical power (such as vehicles, portable electrical appliances, electrical hand tools, portable electrical machinery, battery chargers, or portable light fittings) capable of deriving at least some power from fixed conductor(s) arranged along the route or sites along which said devices may be located. It has particular application to an inductive power transportation system in which inductive power is distributed to a plurality of vehicles some or all of which may be moving or stopped at points along a path associated with said conductor(s).

BACKGROUND

Although this invention may be applied in a variety of situations its main application is expected to be in conjunction with vehicles requiring some on-board electrical power and in particular to electrically driven vehicles. The application of this invention to materials handling systems and in particular to monorail and conveyor systems has been licensed to DAIFUKU CO, LTD., of 2-11, Mitejima 3-Chome, Nishiyodogawaku, Osaka 555, Japan which is believed to be one of the largest manufacturers of conveyors and materials handling systems in the world.

Guided vehicle technology is of growing importance in automated warehouses, robotic and computer-controlled assembly lines and the like. Electric passenger transport has been widely used for many years but the usual overhead conductors present many problems including aesthetics, danger, cost, installation, maintenance, and the collectors attached to the moving vehicles (such as pantographs or carbon block devices) frequently come off the wires and disrupt other traffic. Vehicles tied to such wires cannot pass one another. Wiping surface contacts are prone to interruption as a result of contamination.

Inductive power transfer appears in theory to offer an attractive alternative to pantograph or brush contact devices by eliminating the risk of sparking or mechanical problems associated with faulty contacts. However, prior art proposals have not resulted in the practical distribution of power to electric vehicles.

PRIOR ART

In the 19th century many patents were published in the United States concerning inductive transfer of electrical (telegraphic) signals from moving railway vehicles and the like to rail side conductors. These did not involve the transfer of significant amounts of energy. There were also a number of patents dealing with motive energy transfer, even by high-voltage capacitative means (TESLA U.S. Pat. No. 514,972) but the only relevant historical patent to this work is that of HUTIN and LeBLANC (U.S. Pat. No. 527,857) of 1894, in which the use of approximately a 3 KHz alternating current, induction is suggested. More recently theoretical work of OTTO (NZ 167,422) in 1974, suggested the use of a series resonant secondary winding, operating in the range of 4 to 10 KHz, for a vehicle such as a bus.

OBJECT

It is an object of the present invention to provide an improved system for the distribution and transfer of electric power, or at least to provide the public with a useful choice.

STATEMENT OF THE INVENTION

In one aspect the invention provides an inductive power distribution system comprising: an electric power supply;

a primary conductive path connected to said electric power supply;

one or more electrical devices for use in conjunction with said primary conductive path;

the or each device capable of deriving at least some power from a magnetic field associated with said primary conductive path;

the or each device having at least one pick-up coil comprising a resonant circuit having a pick-up resonant freuquency, and at least one output load capable of being driven by electric power induced in the pick-up coil, wherein there is means for preventing the or each device from presenting a reduced load to the primary conductive path.

In one form of the invention, the means for preventing the or each device from presenting a reduced load to the primary conductive path, comprises means for maintaining the output load above a predetermined threshold.

In a more preferred form of the invention the means for preventing the or each device from presenting a reduced load to the primary conductive path comprises means for changing the power coupled between the primary conductive path and the pick-up coil.

Preferably the one or more electrical devices are mobile or portable devices.

In one of the optional forms of this invention the output load comprises a battery charger supplying power to one or more batteries.

In its most preferred form the invention is concerned with one or more vehicles capable of moving along a primary conductive path.

In another aspect the invention provides an inductive power transportation system comprising: an electric power supply; a primary conductive path connected to said electric power supply; one or more vehicles for use in conjunction with said primary conductive path; the or each vehicle capable of deriving at least some of its power from a magnetic field associated with said primary; the or each vehicle having at least one pick-up coil comprising a resonant circuit having a pick-up resonant frequency, and at least one electric motor capable of being driven by electric power induced in the pick-up coil, wherein there is means for controlling the power coupled between the primary and pick-up coil.

Preferably the primary conductive path comprises a primary resonant circuit.

Preferably the transportation system provides means for supplying inductively coupled power from a pair of spaced apart substantially parallel conductors, supplied with an alternating current, to a pick-up coil on a vehicle capable of traveling along said pair of parallel conductors, wherein said pick-up coil is tuned to maximise the power coupled between the alternating current in the parallel conductors, and the pick-up coil.

In another aspect, the invention provides means for supplying inductive power from a pair of spaced apart substantially parallel conductors, supplied with an alternating current, to a pick-up coil on a vehicle capable of traveling along said pair of parallel conductors, wherein said pick-up coil is tuned to maximise the power coupled between the alternating current in the parallel conductors, and the pick-up coil, and wherein a second shielding isolated coil is optionally provided on the vehicle between the pair of parallel conductors and the pick-up coil.

Preferably a switch is provided on the shielding coil, so that if the switch is closed the isolating coil can be short circuited, to reduce the coupling between the pair of parallel conductors and the pick-up coil.

Alternatively the switch may be provided on the main pick-up coil, to allow or prevent resonant current from flowing in the main pick-up coil. In a preferred arrangement the switch is in parallel with a capacitor in the pick-up coil so that if the switch is closed the capacitor can be short circuited, to define the pick-up coil and reduce the power coupling. In a less preferred arrangement the switch can be in series with the capacitor so that when the switch is opened the resonant circuit is broken.

In yet another aspect the invention provides for optimising the current/voltage ratios, construction of, and placement of the fixed primary conductors.

In a particular aspect the invention provides for the generation of electric power in a sine wave alternating form, relatively free of electromagnetic radiation, by an electrically tunable, resonant DC-AC converter.

In a yet further aspect the invention provides means for collecting an effective amount of electric power on board the vehicle from said primary conductors by means of the induction principle and a resonant secondary winding.

In another aspect the invention provides a high frequency resonant DC-AC power converter.

Preferably the power supply comprises means for the conversion of a supply of electric power into an alternating current at a nominal frequency between 50 Hz and 1 MHz, said conversion means being adapted for use with a resonant load. More preferably the nominal frequency is between 1 KHz and 50 KHz, and in the examples reference will be made to the currently most preferred frequency of 10 KHz.

In another aspect the invention provides a maximum power AC-DC converter capable of converting power from an inductive pick-up coil.

In a still further and particular aspect the invention provides for maximised power transfer from the said resonant secondary winding by means to sense the output coil voltage and inhibit the instantaneous drain of current from the coil while the mean coil voltage is beneath a preset threshold.

An immediate application of the present invention is expected in rail-based storage systems for warehouses and the like. Systems embodying this invention may be seen as direct competitors in many applications to conventional conveyor belt systems but with some important advantages such as low cost, control flexibility, and smooth operation. In addition, it is free from dangerous moving belts, and is suitable for operating in hazardous environments owing to the lack of exposed conductors, its spark free construction and the potential to be totally enclosed against water penetration. It may be safely used where pedestrian traffic abounds. The rail storage system consists of a number (potentially hundreds) of self propelled vehicles traveling on rails, with each vehicle deriving its power through an inductive coupling from a conducting loop energised at high frequency which resides beside the vehicle and parallel to the rails, as shown in FIG. 1.

Non-vehicular applications include instances where it is required to energise electrical appliances or machinery without direct contact with live electrical conductors. For example this includes portable objects, such as lighting stands in a photographer's studio or equipment in an operating theatre, where it is desirable to be able to conveniently pick up the device then put it down in an immediately functional state, without attendant electric flexes. Lights may be placed in swimming pools equipped with concealed energising conducting loops. Safety is an important issue in all these applications.

DRAWINGS

The following is a description of preferred forms of the invention, given by way of example only, with reference to the accompanying drawings.

GENERAL

FIG. 1: shows an inductively powered monorail conveyor.

FIG. 2: is an illustration of some versions of the invention configured as a basic straight-line rail storage system.

POWER SUPPLY

FIG. 3: is a circuit diagram showing an example of the resonant DC-AC power converter of the present invention.

FIG. 4: is a circuit diagram showing an example of the current limiting controller for the resonant DC-AC power converter of the present invention.

FIG. 5: is a circuit diagram showing an example of the resonant controller for the resonant DC-AC power converter of the present invention.

FIG. 6: is a circuit diagram showing the principles of another embodiment of switching power supply or resonant DC-AC power converter of the present invention, having an isolated output.

FIG. 7: shows how the resonant frequency of a DC-AC power converter may be altered by electrical commands.

TRACK

FIG. 8: is a diagram showing inductive tuning means for adapting tracks of different lengths to a consistent inductance and hence a consistent resonant frequency.

FIG. 9: is an enlarged cross-section on line AA of FIG. 8.

FIG. 10: shows the relationship of the vehicle and the primary conductors of a monorail system.

VEHICLE

FIG. 11: is a circuit diagram showing the principles of the maximum-power AC-DC converter of the present invention.

FIG. 12: is a circuit diagram showing the control circuitry for the switch mode power supply and coil controller AC-DC converter of the present invention.

FIG. 13: is a circuit diagram showing the control circuitry for the maximum-power AC-DC converter of the present invention.

FIG. 14: illustrates the circuit of FIG. 12 in a simplistic manner.

FIG. 15: is a circuit diagram showing the principles of the brushless DC motor drive used in one embodiment of the present invention.

FIG. 16: illustrates a transmission line and tuned pick-up coil.

FIG. 17: illustrates the mutual coupling between the transmission line and the tuned circuit.

FIG. 18: illustrates schematically the effect of the mutual coupling.

FIG. 19: illustrates the effect of an additional short circuited coil.

FIG. 20: illustrates the effect of control wiring mounted in the track.

FIG. 21: illustrates a means for providing increased power in a section of the track.

FIG. 22: illustrates a means for providing power to branch tracks or to other ancillary equipment from the power in the primary inductive loop.

FIG. 23: illustrates a switch in parallel with the capacitor of a pick-up coil.

FIG. 24: illustrates a switch in series with the capacitor of a pick-up coil.

FIG. 25: illustrates a complementary load circuit.

FIG. 26: illustrates a battery charger.

FIG. 27: illustrates an incandescent lighting installation

FIG. 28: illustrates a fluorescent lighting installation.

PREFERRED EMBODIMENTS IN GENERAL

The novel principles described within this specification may be applied in a number of ways, having in common inductive electric power transfer from a fixed primary conductor across a void and into one or more secondary pick-up coils, and subsequent electric power utilization generally but not always without storage. Many applications relate to supply of motive power to vehicles, but lighting, other types of motor drive, and the charging of batteries are also catered for.

An installation may comprise at least one resonant or a non-resonant primary circuit. Each primary circuit may be comprised of a pair of parallel conductors in the form of an elongated loop, or it may be comprised of a single conductor in an open loop. In most cases the primary conductors are to run uninterruptedly alongside the designated path or track taken by vehicles, although intermittent availability (e.g. at declared bus stops) and intermediate energy storage within the vehicle is an alternative.

The track may be comprised of a tangible structure such as a railway track, conveyer belt, or monorail, or it may be an invisible path defined in use by the field emanating from one or more concealed conductors within a roadway or floor.

The preferred operating frequency is generally in the region of from 10 to 50 KHz, particularly reflecting limitations of the solid-state switches available-and also limitations imposed by conductor losses, though the principles may be applicable to a much wider range of frequencies, such as from 50 Hz to 1 MHz. Prototypes have been built with operating frequencies of the order of 10 KHz and available power levels of 150 W and 500 W, the latter supplied at 500 V and capable of energising a 165 meter length of track.

Secondary pick-up coils are preferably resonant and are, especially in the case of a varying load, preferably connected to the load through power conditioning means, either a maximum-power conversion device, or more preferably a combined pick-up coil disengaging device together with a current limited output. These are relevant to both resonant and non-resonant primary conductors because of the disturbing effect that a lightly loaded pick-up coil has on power propagation past its position.

Even larger installations may be constructed by scaling up the power-handling electronics, and the number of vehicles or the motor, and motor drive circuitry on each, without departing from the novel concepts described here. Given a real voltage limit, long tracks may preferably be divided into sections; each fed from one of a number of separate power supplies. Some options are illustrated in FIG. 2.

PREFERRED EMBODIMENT 1

A first preferred embodiment particularly describes a medium-sized 500 W prototype that employs an on-board induction motor to move a vehicle, or several similar vehicles, along a cantilevered track—as shown in FIG. 1—besides primary cables carrying resonating currents and energised by a switching power supply. While this system, with an approximate track length of up to 165 meters, has a feed voltage of the order of 500 V and a circulating resonant current of the order of 60A the entire primary cable is further insulated by enclosure in an extruded plastic case. It is thus free of commutation sparks and may be acceptable for an explosive atmosphere, such as within a mine.

In FIG. 1, 1100 is the cantilevered track which is an I-sectioned aluminium girder having a flat bearing surface 1101 and a pair of parallel conductors 1102 and 1103 supported from the recess on one side. 1104 is the entire vehicle, and comprises 1106 and 1107, supporting and driving wheels respectively, and 1105, a drive motor. The pick-up coils for the vehicle are located adjacent to the drive motor 1105 and the conductors 1102 and 1103 and are not visible (for details of this, refer to FIG. 10, for example).

FIG. 2 illustrates several options for the power distribution system. A first version 2100 refers to a system running two vehicles 2101 and 2102. These vehicles run with flanged wheels upon a track, 2103 and 2104. An outgoing and an incoming loop of primary conductor 2105 and 2106 are connected at one end to a capacitor 2107 (an optional device, preferable for longer tracks) and at the other end to a capacitor 2108 and also to a high-frequency power source, an alternator 2109 driven by external motive power.

A second version 2200 is shown with just one vehicle 2201. This version is non-resonant; its primary inductor, which might comprise several turns of cable, is driven from a switching power supply 2202 through a step-down transformer 2203. It is likely that the current within the primary inductor 2204 is non-sinusoidal.

A third version 2300 is shown with just one vehicle 2301. This version is resonant; it is driven from a switching power supply 2302 which includes a tuned circuit comprised of a capacitor 2303 and an inductance 2304 which also serves as the primary of an isolating transformer 2304. In this case, circulating current is present within the transformer 2304 as well as within the capacitor 2303, so the transformer needs to have a VA rating capable of accommodating the resonant power circulating within the primary conductor 2305 as well as the available power to be fed in or drawn off the resonant circuit. The power circulating within the resonant circuit is substantially sinusoidal. Although the primary inductor of the system could be driven with any alternating power the use of a sine wave current delivered at the average resonant frequency of all associated tuned circuits is preferable. Sinusoidal current minimises the emanation of radio-frequency emission by harmonics and enhances the efficiency of transfer of circulating power to dependent tuned circuits.

A fourth and preferred version 2400 is also shown with a single vehicle. In this version, the capacitor 2403 together with the inherent inductance of the primary inductor 2405 constitutes the resonant circuit and all other components of the power supply 2402 need be rated for only the feed power and not for the greater levels of resonating power. The power within the resonant circuit is substantially sinusoidal. Additional inductors, as shown in FIG. 8, may be inserted between the power supply and the track in order to maintain a consistent inductance between installations of different length. Additional capacitance may be included at the end of the track for longer tracks. The power supply 2402, which now comprises a switching power supply slaved to the resonant frequency of the track 2405 and the capacitor 2403 is described in more detail in the next section.

A fifth version resembles that of the fourth, except the terminating capacitor is omitted. This configuration may be preferable in shorter track length installations to reduce the cost.

HIGH FREQUENCY DC-AC POWER CONVERSION—BY SWITCHING POWER SUPPLY OR RESONANT DC-AC CONVERTER

Output Characteristics

The resonant system for passing power to mobile vehicles would be made to run at a high frequency for the sake of minimal component size, yet as the frequency rises radiative, adjacent-conductor eddy current, and skin-effect losses also rise within for instance the distributed primary conductors which both detract from efficiency and also cause electromagnetic interference. With presently available semiconductors, 10 KHz is a reasonable design figure, though it should not be regarded as the only possible choice. Frequency may rise as far as 50 KHz, but skin-effect losses within conductors become relatively significant above this frequency. It may be preferable in some cases to use 400 Hz power as this is an industry standard, particularly within the aircraft industry, where otherwise (as on airport ground transport installations) particular frequencies such as 28.5 KHz may be selected for having no harmonics potentially interfering with navigational or communications equipment. The upper operating voltage is at present practically limited to about 600 V, both by capacitor ratings and by voltage limits on semiconductors.

The circuit for this device is illustrated in FIGS. 3 to 7, where FIGS. 3-5 are detailed circuit diagrams for an embodiment corresponding to 2402 in FIG. 2, and FIGS. 6 and 7 illustrate a different embodiment.

In FIG. 3, 3100 indicates a source of raw DC power; in this case a three-phase bridge rectifier is shown fed from a 400 V mains supply via a step-down transformer 3105. The transformer also provides electrical isolation of the primary conductor from the mains supply. 3L1 and 3L2 improve the input power factor and protect against conducted interference propagating from the high-frequency section, 3103. 3101 is a soft-start device including a power device 3Q3 and 3102 is a converter, involving the diode 3106 and the inductor 3L3, conventionally controlled from the current-limiting controller 3107, with its power supply 3108. The 3LEM device senses the supplied DC current.

The primary resonant circuit of this system comprises the capacitor 3C2—which may include frequency-adjusting supplementary capacitors (see FIG. 7)—and the primary inductive distribution conductor itself together with optional additional inductances, having a preferred total inductance of 133 microhenries. Circulating resonant current, which may be of the order of 60 A, normally flows only through the primary inductor, connections to the power supply, and through 3C2. It does not flow through 3L4, (where a few mA only of AC current have been measured during use) and this balanced phase-splitting transformer may be constructed without an air gap. As it carries no more than the DC component of the added power, it may be relatively small. Resonant current does not flow through the switching transistors 3Q1 and 3Q2 either, though the preferred insulated-gate bipolar transistors (IGBT) are capable of absorbing the circulating energy as a transient in the early stages of a developing fault—such as a short-circuit on the track).

Although the converter includes a pair of hard-driven on/off switches as the primary power-handling elements, by reason of its connection to a resonating or tank circuit it is in effect a DC to AC converter having a sine wave alternating current output. It maintains a resonating current by switching 3Q1 and 3Q2 in a complementary manner from a low to high impedance state, at the moment the capacitor voltage is zero (detected through the inputs labelled 301 and 302). Apart from the cases of a special startup and a special power-down mode, the switching converter imposes no particular frequency (subject to upper frequency limits as a consequence of device physics) on the resonating current; it is simply a slave driver that operates at the natural ringing frequency of the circuit.

Startup and power-down situations are managed by arranging that the reserve charge in the power supplies to the control circuits significantly anticipates and outlasts that of the main energy supply for conversion, so that the controllers function both before and after resonant power exists in the track, and at those times the resonant power controller emits 10 KHz pulses based on its own clock activity.

Since loading on the track may cause the operating frequency to shift significantly from the design frequency and so reduce the effectiveness of inductive coupling, optional means for tuning the resonant frequency during operation may be provided, as indicated in FIG. 7. The main switching transistors are indicated by 7S1 and 7S2. A series of paired and preferably matched capacitors, indicated as 7Ca, Ca', Cb, Cb', and Cc, Cc' are shown, capable of being switched into or out of circuit instantaneously by control signals applied to the accompanying solid-state switches, 7S20, S20', S21, S21', and S22 with S22'. Clearly these devices will carry a fraction of the circulating currents and should have adequate heat sinks, and they will also need to have suitable voltage ratings for this application. In addition, FIG. 8 shows inductive tuning arrangements suitable for trimming the resonant circuit at the time of installation.

FIG. 4 illustrates the current-limiting controller. The lower section 4102 is the soft-start section, and the current-limiting section is 4101. In the soft-start section, the resistor 4R11 and the capacitor 4C4 set the time delay. The first comparator 4103 determines the moment after power application at which the charge in 4C4 exceeds the 10 V reference applied to its (−) input. The output of 4103 is applied to the gate of 4Q3 which is identical with the device 3Q3 in FIG. 3. The upper section 4101 accepts and amplifies the signal from a "LEM" current-sensing device and applies it to comparator 4104 to be judged against an approximately 5 volt threshold, modified—to provide hysteresis—by the wired OR output of comparator 4105 and comparator 4104. The fourth comparator 4106 inverts the above output and applies it—in the absence of too much current—to a drive circuit of transistors 4Q1 and 4Q2 for application via resistor 4R15 to the gate of the transistor 3Q4 in FIG. 3.

In FIG. 5, 5100 represents the section for detection of the voltages developed by the resonating currents within the inductor. It comprises ½ of an LM319 comparator with the opposing voltages fed to opposite inputs. The output is therefore a reflection of the (+)ve input, summed with the complement of the (−)ve input. 5101 shows the section responsible for determining the amplitude of the resonating capacitor voltage, and for enabling the supply of internally generated pulses at the design centre frequency from section 5102 should the amplitude be low (as for example at start-up). The input signal is rectified by diodes D3, D2 and compared to a reference voltage. If the detected AC is too small, the internal clock 5102; a simple trimmable RC oscillator about a binary divider is activated. Section 5103 shows gates to drive the pair of ICL 7667 gate drive devices with a complementary, phase-linked current which in turn control the power switching transistors or commonly IGBT devices (2Q1 and 2Q2 of FIG. 2).

PRIMARY INDUCTOR CABLE-TUNING

Our preferred use of the actual track as the inductive part of the primary resonant circuit requires, as a result of there being a preferred resonant frequency for supplied modules such as vehicles, that the resonant frequency of the track be substantially constant between installations. An inductance value of 133 microhenries is preferred regardless of actual track length. FIGS. 8 and 9 illustrate a system for tuning the track to a particular resonant frequency. In order to combat the effects of differing track lengths a set of discrete or modular inductances 8100 may be installed between the power supply side 8101, 8103, and the track side 8102, 8104 and conveniently these may be a number of individual gapped toroidal ferrite cores 8105, preferably of a low permeability in order to avoid saturation. Such toroids have a preferred thickness of 40 mm, an internal aperture of 20 mm, and an external diameter of 60 mm. The air gap 8106 is preferably 0.67 mm. (8108 is a support plate.) Each toroid when placed about one conductor 8107 presents substantially the same inductance as one meter of track. At the time of installation the track length is measured, and should it be less than 165 meters the track inductance is raised by threading each litz wire conductor through one toroid per meter of the shortfall in the track length. On activation the actual resonant frequency may be measured and the toroid chain supplemented or reduced in order to fine tune the resonant frequency to its target value.

The primary inductive loop may carry a heavy circulating alternating current of the order of 60A at a frequency of 10 KHz. The inductive energy (magnetic flux) radiated from this current at this high rate of change tends to cause eddy currents both within the conductor and also within conductive and particularly within ferromagnetic materials within the flux field. The primary loop, used to distribute the power along the path or paths taken by the moving vehicles consists of a separated, parallel pair of cables (see FIG. 1, 1101 and 1102) each preferably constructed of a cable composed of multiple thin insulated wires (known generically as "Litzendraht" or litz wire) to reduce skin-effect and particularly adjacent-conductor eddy-current conduction losses. One preferred type of commercially manufactured litz wire is made of around 10,240 strands of 40 gauge enamelled copper wire within a diameter of approximately 13 mm. Another option is the use of telephone cable of the type having multiple insulated conductors. The spacing of the cables is a compromise. If they are too close together their fields will cancel each other and the coupling to the vehicle pick-up coils will be poor. Conversely, if they are too far apart the track inductance rises significantly, requiring a greater drive voltage and the pick-up coil losses will be unnecessarily high as there will then be a significant bridging portion of the pick-up coil carrying current yet not being cut by the fields. The practical limit of 600 volts, as determined by device ratings, drives about 200 meters of track @ 60 A. This length can be approximately doubled by placing a second, series capacitor in the cable to reduce the reactive power requirement, as depicted in FIG. 2—2100 and 2400.

Conveniently, the litz wire 9110 and 9111 may be contained within a duct comprised of a plastic extrusion having a goblet-like section, as illustrated sectionally in FIG. 9.

FIG. 10 illustrates the actual primary-void-secondary relationships of this embodiment, in section. The scale of this drawing is approximately 120 mm along the back of the ferrite "E"-section 10102, and the cantilevered monorail of FIG. 1 is based on this section.

10100 illustrates the combination of a strong support member 10101, typically an aluminium extrusion of an "I"-section shape, having an upper load-bearing surface 10103 upon which vehicle wheels may run. The side 10104 is adapted with extensions 10106 and 10107 for mounting of the support member. The side 10105 is adapted to bear the supports for the primary conductors. 10110 and 10111 are the two parallel primary conductors preferably of litz wire. They are supported within ducts on standoffs 10112 and 10113 as described with reference to FIG. 9. The standoffs are supported on a sheet 10114.

Preferably all materials are either non-conducting, such as plastics, or are non-ferrous metals such as aluminium. If ferrous material has to be situated adjacent to one or more of the primary conductors or to the vehicle's secondary pick-up coils, it has been found advantageous to shield such ferrous material with an aluminium coating of several millimeters depth, whereupon in use the eddy current generated serve to block the further penetration of magnetic flux, and so minimise the loss of energy due to hysteresis within the ferromagnetic material.

The preferred ferrite core 10102 of the pick-up coil is composed of a number of stacked E-shaped ferrite blocks together with plates 10117 bolted on the central shaft. The central limb is preferably 20 mm thick and the total length of the pick-up coil assembly is typically 260 mm. Preferably an occasional block is deleted from the stack to allow for air cooling of the secondary coil, which in use may carry 20 A of circulating current. The pick-up coil 10115 together with one or more optional accessory coils as 10116 are wound about the central leg of the ferrite core. The coupling of flux from primary conductor 10110 and 10111 to the ferrite is relatively efficient as the primary conductor is almost fully enclosed by the ferrite.

The vehicle (not shown) exists to the left of the ferrite 10102, to which it may be directly attached by bolts or the like (even if made of cast iron) as the varying flux is substantially contained within the ferrite itself.

The pick-up coil, of which there may be one or more on a given vehicle, comprises a tuned circuit resonant at the design frequency of the primary inductive loop. Preferably the pick-up coil comprises a number of turns of litz wire wound around the central leg of a core composed of ferrite material, the core providing a flux-concentrating function to enhance the efficiency of inductive coupling. In use, the presence of high resonant currents together with multiple turns of conductor causes quite a high magnetic field within the vicinity of the coil. Preferably the resonating capacitor (which may provide for additional capacitance units in order to adjust the resonant frequency) is in parallel connection with the coil, and rectifying means (preferably fast power rectifier diodes) are wired in series with the load across the capacitor. It is desirable to have a high Q pick-up coil because more power can be extracted from it, but because an increase of the coil Q tends to increase its size and cost, a compromise is required. Moreover, a high Q pick-up coil may pose tuning problems for small variations in operating frequency. The number of turns, and the associated resonating capacitor may be selected for the voltage/current ratio required for optimum matching to subsequent circuits. As shown in FIG. 11, the core for the pick-up coil is located so as to maximise the interception of magnetic flux from the primary loop.

A second pick-up coil may also be installed on the ferrite stack, to act as a decoupling means to shield the main pick-up coil from the magnetic flux. Its operation will be described in relation to the controller. (See "Tuned pick-up coil and operational features"-later).

A further auxiliary pick-up coil may also be provided, preferably at a site not coupled to the main pick-up coil, to separately energise the on-board electronic circuits.

DETAIL OF SWITCH MODE POWER SUPPLY—FIG. 12 and FIG. 14

A simplified schematic of the switch mode controller is shown in FIG. 14. The voltage across the coil tuning capacitor (14112) is rectified by (14114) and filtered by (14121) and (14122) to produce a DC voltage. Comparator (14117) monitors this voltage and compares against a reference (14118). If the load power is less than the maximum power able to be sourced from the pick-up coil, then the capacitor voltage will increase. This will cause the comparator to turn on switch (14113) thereby effectively shorting the pick-up coil. Diode (14122) prevents the DC output capacitor from also being shorted. The result of this action is the power transferred from the pick-up coil is virtually zero. Consequently, the DC voltage across (14115) will decrease until the point where the comparator will turn off the switch again. The rate at which this switching occurs is determined by the hysteresis about the comparator, the size of capacitor (14115) and the difference between the load power and the maximum coil output power.

FIG. 12 shows in some more detail the switch mode controller.

In this figure, the pick-up coil is connected at 12P1 between terminals 1 and 3. An array of capacitors 12CT1, 12CT2, and the remaining of the series (for typically five are required to reach 1.1 $\mu$F) are the resonating capacitors. A bridge rectifier comprised of the four fast-recovery diodes 12D4–D7 rectifies the incoming power to 12L1, comprising a choke-input filter for the capacitors 12C7 and 12C8. The DC power is fed to the load at terminals 1 and 3 of connector 12P2. The DC voltage is monitored by 12R1 and buffered by 12IC1:A. If it exceeds a reference value as determined by 12REF3 then comparator 12IC1:B will turn on 12T1, a high-current FET device which serves to short circuit pick-up coil. The preferred rate of this switching action is nominally 30 Hz. 12T2 provides current-limiting protection for the FET and varistor 12V1 provides voltage protection.

If the load power exceeds the maximum possible from the pick-up coil the output voltage will always be below the reference set by 12REF3, and switch 12T1 will always be off. If the load is an inverter driven AC motor then this can occur during high acceleration rates. The controller in FIG. 12 provides a means of maintaining maximum power transfer in such instances by generating an optically coupled control signal that can be used to instruct the inverter to reduce its acceleration rate. The signal is produced by comparing the voltage at 12P2 with a triangular carrier imposed just below the reference level set by 12REF3. The triangular carrier is produced by a relaxation oscillator 12IC1:C, while 12IC1:D performs the comparison. The optical isolation is provided by 12IC2.

Thus the circuit in FIG. 12 attempts to maintain the output voltage between an upper and a lower limit, and maintains the resonant current within the pick-up coil below an upper limit.

TUNED pick-up COIL and OPERATIONAL FEATURES

It has been found that particularly but not exclusively in installations wherein the primary loop is in a resonant state that a lightly loaded vehicle can block power from reaching other vehicles distal to the lightly loaded vehicle. This effect appears as a result of high levels of current circulating through the lightly loaded pick-up coil, which interact with the resonant power in the primary inductors. Therefore a controller or vehicle power conditioner has been developed which combines two separate vehicle functions; namely disengagement or disabling of the pick-up coil whenever the coil output voltage rises above a preset threshold, and also limiting of the output current whenever the output current drain rises above a second threshold. This system is a preferred power control method as, unlike the maximum-power approach it can provide conversion efficiencies of over 80%.

Disengagement of the pick-up coil can be provided mechanically, by causing a physical separation of the coil away from an optimum [position close to the primary conductors]. Disengagement can also be provided electrically. For example it may be implemented by a series switch within the resonant circuit, which may be opened to interrupt current flow. For regulation purposes it may be opened repetitively (for example at around 20–100 Hz) so as to provide an output voltage fluctuating about a target value. For movement control purposes it may be held open for the desired duration. This approach has the disadvantage that the switch, which must be a bidirectional switch, shows a series voltage drop of over 2 volts at the observed resonant current levels in the pick-up coil, resulting in a loss of perhaps 50 to 100 W. A second, preferred through perhaps surprising option is to short out the pick-up coil by closing a switch across the capacitor, thereby removing the resonating element from the system. This closed switch does not carry much current, for the circuit is no longer resonant, so losses are small and in any case do not impair load-carrying modes. At the moment of closing the switch the stored charge within the resonant circuit is small. If the intended output is a high-current, low-voltage option there will still be a significant loss in this switch when sorted, so a third preferred option is to provide a secondary pick-up coil having a relatively greater number of turns. When such a coil is shorted, the current flow through the switch is relatively small.

In the operation of a vehicle system, using an inductive pick-up, the output power demanded from the motor can vary over a wide range. In consequence, the electrical power demand can also vary quite widely. For lightly loaded applications, a problem occurs, since the impedance reflected back to the parallel wire transmission line will also vary widely. In this example, the pair of parallel conductors described above should be considered as a transmission line, as shown in FIG. 16.

In FIG. 16, Reff represents the effective motor load presented to the tuned circuit, of the pick-up coil. This corresponds to the inductive pick-up coil of FIG. 13. If the transmission line is driven by a voltage source, then the effective mutual coupling is shown by the circuit illustrated in FIG. 17.

The effect of the mutual coupling M is to transfer an equivalent resistance to the primary side, and this is represented by the circuit shown in FIG. 18. Referring to FIG. 9, if $\omega$ is high, low values for M (i.e. low coupling factors) may be used, and yet still allow a good power transfer capability.

An overloaded motor corresponds to an Reff=infinity, whereas a lightly loaded motor corresponds to Reff~0. Thus in the overloaded case $\omega^2 M^2/\text{Reff} \to 0$ so that no power is transferred, while in the lightly loaded case $\omega^2 M^2/\text{Reff} \to \text{infinity}$, so that it becomes increasingly difficult to maintain the current in the parallel wire transmission line. This last feature is highly undesirable, as one lightly loaded vehicle can then block the power flow to other vehicles on the same line.

It is preferable that a high frequency alternating current is supplied to the transmission line. Such a high frequency current may be generated by a high frequency alternator, or more preferably it may be generated by a power electronic circuit, as described above. In the case of a power electronic circuit, the frequency of oscillation will be determined by the continued reactive load on the link, and the effect of lightly loaded vehicles is to shift the operating frequency away from the preferred operating frequency of 10 kHz by several hundred Hertz. In doing so, this solves the $\omega^2 M^2/\text{Reff} \to \text{infinity}$ problem as off tune circuits reflect lower (reactive) impedance but the off-tune nature again restricts power flow to the other vehicles.

This problem can be minimised by reducing the coupling between the transmission line and the tuned pick-up coil. This solution is based on the observation that the term $\omega^2 M^2/\text{Reff}$ has essentially only one variable—the mutual inductance, corresponding to the coupling factor between the two magnetic circuits. If this coupling factor—usually considered to be constant—can in fact be reduced, then the interaction can be reduced.

One proposed solution is illustrated in FIG. 19. An additional coil is placed between the transmission line and the pick-up coil. This additional coil has a switch S, which if open means that the additional coil has no effect. But if the switch 19S is closed, the this short circuited coil prevents flux paths from crossing it thereby reducing the coupling, and reducing M. The positioning of the additional coil is not critical—provided it intercepts some flux, it will work. It is particularly preferred that the additional coil intercepts the flux while affecting the inductance as little as possible. In practice, this is not difficult to achieve. Switch 19S may be a power electronic switch of any one of a number of well known configurations.

In operation, the voltage across the tuned circuit $V_T$ is monitored and if it goes too high, then the circuit is too lightly loaded, and switch S is turned on to reduce it. If the voltage $V_T$ is low switch S is left open.

This circuit is compatible with the overload circuitry, which also uses $V_T$ to implement control of the rectifier.

PREFERRED EMBODIMENT 2—150 W VERSION

This preferred embodiment particularly describes a small-scale 150 W prototype that employs an onboard brushless DC motor to move a vehicle, or several similar vehicles, along a track above energised primary cables running at 10 KHz. This entire system is thus free of commutation sparks and may be suitable for an explosive atmosphere, such as in a mine.

HIGH FREQUENCY DC-AC POWER CONVERSION

The circuit for the power source for this device is illustrated schematically in FIG. 6.

The current fed into the high frequency cable 6101 and 6102 is generated using a solidstate switching converter 6100 operating in a resonant mode to produce a near-perfect 10 kHz sinusoidal waveform. Consequently, the radio-frequency interference transmitted from the conductor is negligible as the harmonic content of the power is low—under 1%—and the system would be suitable for operating in communication-intensive locations such as airports.

The resonant circuit in this embodiment is contained within the centre-tapped inductor 6L1 and the capacitor 6C1 within the power supply, thus these components must be capable of supporting the intensity of the resonating current. The inductive conductor is preferably also resonant at the same frequency. Because this design provides electrical isolation at the transformer 6L1 it is particularly amenable to small-scale systems, where safety is important, and also to situations in which a relatively high supply voltage from 6Edc may be transformed to a different voltage.

To provide the necessary current step-up in the track and to minimize the effect of load changes on the operating frequency of the converter, the turns ratio of the ferrite potcored high frequency transformer is made high in this preferred embodiment by placing only one turn on the secondary side. To further minimize the effects of loading on the frequency the impedance of the high frequency tuned circuit ($Z=\sqrt{(L1/C1)}$) is deliberately made to be low. However, a compromise must be made when choosing Z since low values result in a high primary circulating current that reduces the efficiency and increases the cost and size of the converter owing to the higher C1 capacitance required. The primary side transformer winding (L1) should be constructed of multiple strands of insulated, narrow diameter wire to reduce losses due to skin effect, while the input inductor Ls can be wound with ordinary solid wire since essentially only DC current flows in it.

The resonant converter shown schematically in FIG. 6 is controlled by alternately gating the two switches 6S1 and 6S2 on for 180° of the ringing period of 6L1 and 6C1, using a circuit such as that of FIG. 5. If the input voltage 6Edc is below a certain level (such as occurs at start up) gating is controlled by an oscillator running at approximately the resonant frequency for the circuit of ($f=1/\sqrt{(L1C1)}$). Once the voltage Edc has exceeded this set level and a few further milliseconds have elapsed, the fixed oscillator is switched out and S1 and S2 are instead gated at the damped resonant frequency by detecting the C1 voltage zero crossings and switching at those times. This ensures that under all load conditions S1 and S2 turn on and off with zero voltage across them, minimizing the switching loss in the two devices.

The two power switches 6S1 and 6S2 are shown as MOSFETs, but they could equally be bipolar transistors, IGBTs or GTOs (gate turnoff thyristors), or any other solid-state switch designed to handle the power levels that may be required in a particular application. Their gates are driven by a controller such as that described in FIG. 5.

The process for capacitative tuning, described above in relation to FIG. 7, also applied to this type of resonant controller.

HIGH FREQUENCY CABLE

In this embodiment also, the high frequency cable that distributes the power along the route(s) taken by the moving vehicles consists of a separated and substantially parallel pair of cables each preferably constructed of multiple thin insulated wires of the type known as litz wire to reduce skin-effect and adjacent-conductor conduction losses. One preferred type of commercially manufactured litz wire contains around 10,000 strands of 40 gauge enamelled copper wire in a diameter of approximately 13 mm, yet is inexpensive. The spacing of the cables is not particularly critical, however if they are too close together their fields will cancel each other and the coupling to the vehicle pick-up coils will be poor. Conversely, if they are too far apart then the pick-up coil losses will be unnecessarily high as there will then be a significant portion of the pick-up coil carrying current yet not being cut by the fields. In addition, the inductance of the track will increase which means more voltage has to be put across it in order to circulate the required current. While this problem can be alleviated to some extent by placing series capacitors in the cable to reduce the reactive power requirement, as depicted in FIG. 2, it does add additional cost and bulk to the cable.

INDUCTIVE pick-up COIL

One form of the pick-up coil comprises several turns of multiple strand wire on a non-ferrous former of preferably rectangular shape, whose width is approximately the same as the high-frequency cable. The multiple strand wire is preferably litz wire (as described above). In this embodiment, a ferromagnetic core has not been used. The coil is connected in parallel with a capacitor whose value is chosen to produce a resonant circuit and tune the coil to the frequency of the distributed power (i.e. 10 KHz). It is desirable to have a high Q pick-up coil because more power can be extracted from it. Because an increase of the coil Q tends to increase its size and cost- and pose tuning difficulties, a compromise is required. An auxiliary pick-up coil is also provided, to energise and synchronise the controller for the maximum-power converter.

MAXIMUM POWER AC-DC CONVERTER

In principle any suitable motor even an AC motor such as an induction motor could be used to drive the trolley if suitable power conversion stages were added after the maximum-power converter. The motor tested in one prototype system is a brushless DC type which has the advantages of being low in cost, light weight, requires low maintenance and is suitable for operating in hazardous environments. The maximum power AC-DC converter is shown generally in FIG. 11, with details of its controller being shown in FIG. 13.

To procure maximum power transfer from the pick-up coil under low to medium Q conditions, a buck type converter shown schematically in FIG. 13 is employed and controlled in a manner that ensures the loaded pick-up coil 13L2 has a Q that is preferably never below half that of the unloaded case. The controller for 13S3 (circuit given in FIG. 14) is switched to maintain the peak voltage 13V1 at the level which delivers maximum power. If V1 exceeds $V1_{ref}$ (in FIG. 11) then the device 13S3 is turned "on" the next time the voltage across 13C2 goes through a zero crossing. If during a half cycle 13V1 does not exceed $V1_{ref}$ then at the next zero crossing 13S3 is turned "off". By employing this integral half cycle control switching loss is minimized and so is the radiated radio frequency interference.

FIG. 13 shows a control circuit capable of driving the gate of 11S3, via the output driver, 13102, an ICL 7667. 13106 is a power supply fed by the auxiliary coil which produces a 10 V output at 13101.

13104 is a zero-crossing detector, locked to the phase of the detected high-frequency current. Its output is passed through a pulse-shaping circuit, 13105 to convert it to spikes, and then to close a D-flipflop, 13107 which energises the gate driver, so long as the comparator 13100 indicates that the supply is in a startup mode threshold (see the time constant at its input) and thereby admits control pulses through the gate 13108. 13103 is the primary sensor of the coil voltage level, and enables 13109.

MOTOR DRIVE

FIG. 15 illustrates one type of motor drive which may be fed with DC, and provide an output torque in proportion to the supplied voltage 15 Vo. (In principle any suitable motor even an AC motor such as an induction motor could be used to drive the vehicle if suitable power conversion stages were added after the maximum-power converter). The motor adopted in a prototype system is a brushless DC type which has the advantages of being low in cost, light weight, requires low maintenance and being spark-free is suitable for operating in hazardous environments. A reduction gearbox couples the motor to the vehicle wheels in order to produce useful driving torque at reduced speed. In the preferred embodiment the vehicle's inertia is such that speed of the motor can also be controlled by simply inhibiting the motor commutating switches 15S4, S5, and S6, in accordance with a defined duty cycle. The speed control circuitry is beyond the scope of this specification and has not been included. The prototype vehicle incorporated simple limit switches at each end of the track to reverse the motor.

15101 comprises an electronic brake; means to tie the motor windings together through the diodes 15102.

POWER CONTROL IN and FROM THE TRACK

It is preferable to be able to control on the vehicle the power to achieve the tasks that the vehicle has to do. However, there are also occasions when control from the track is useful. For near-zero available power the control wiring can be mounted on or in close association with the track and short-circuited as shown in FIG. 21. When switch S is open-circuit it has no effect. When it is closed the vehicles cannot pass this part of the track but they can operate normally on either side of it.

For increased power in a section of the track a coil can be used and energised as shown in FIG. 21. In this drawing the coil is energised by the top conductor. Trolleys passing over this coil see twice the track current 2I and can therefore operate at twice the power level. Values greater than two are easily achieved.

In this and other simple ways, simple loops and coils around the track can be used to control the vehicles. The coil can also be used to sense a vehicle as in FIG. 20 since if the switch S is open-circuit the output voltage rises when a vehicle covers the coil. Then, if required the switch can be closed to stop a vehicle at a precise spot. There are many other extensions to these simple techniques, for example, sense coils can be used to control vehicles at intersections so that collisions cannot occur.

VARIATIONS

By suitably controlling the operation of the switch, the amount of power received by the pick-up coil can be controlled.

Figure 1:
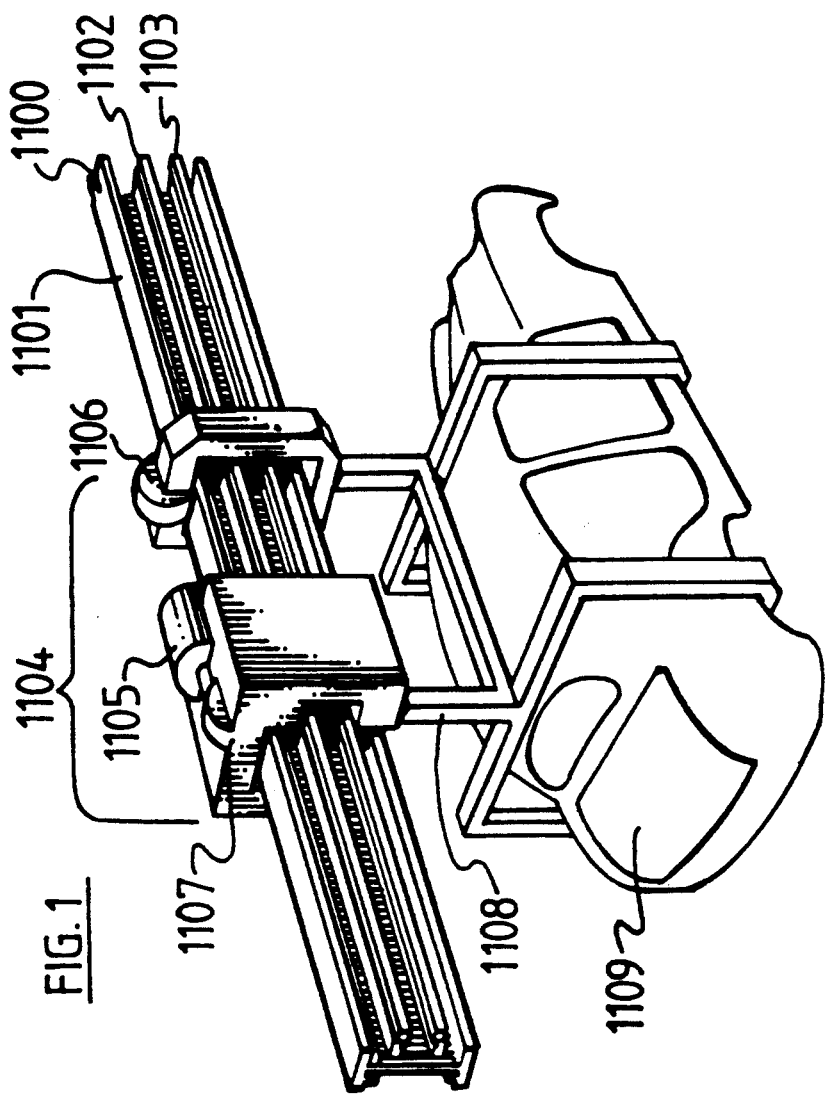
Figure 2:
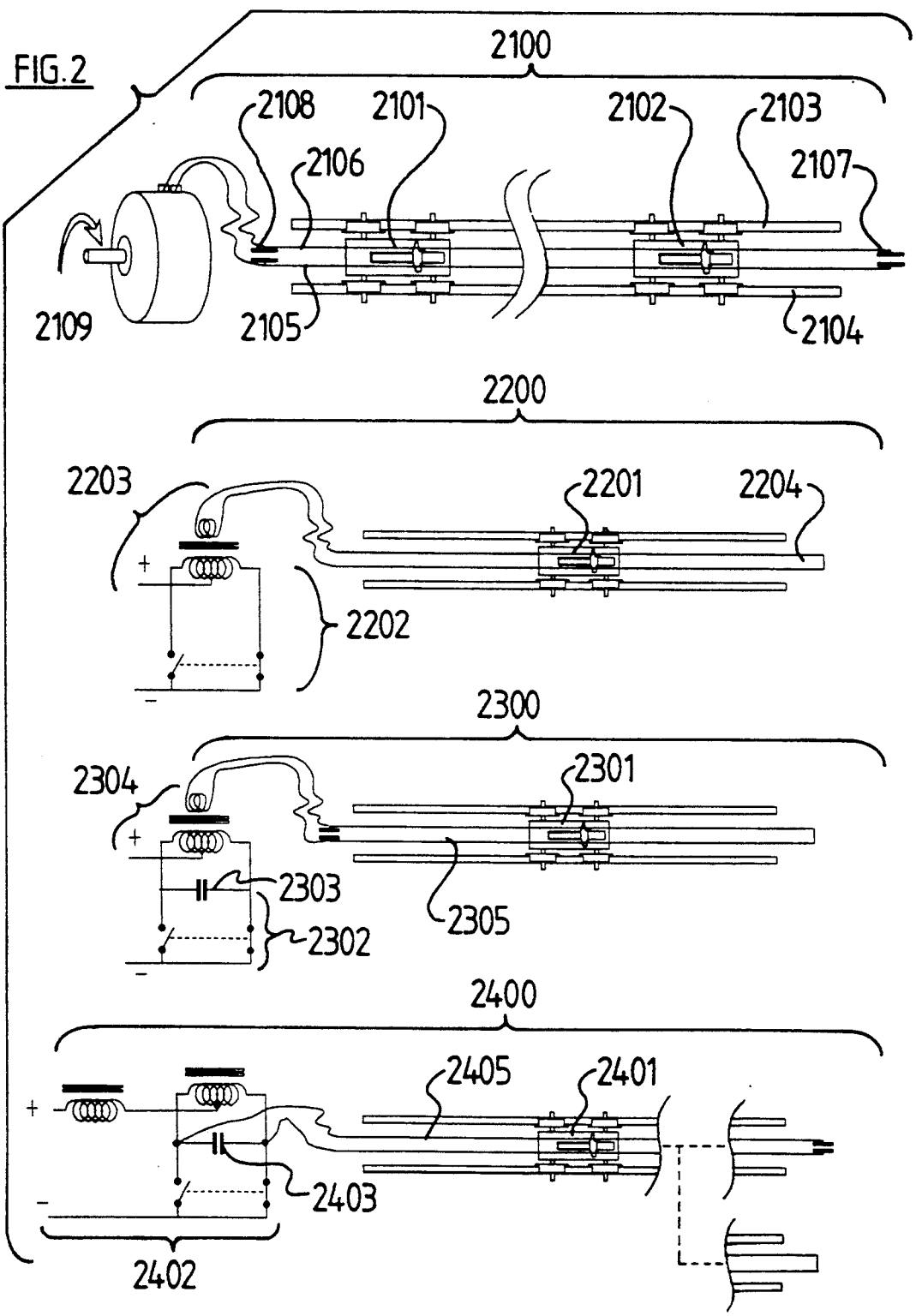
Figure 3:
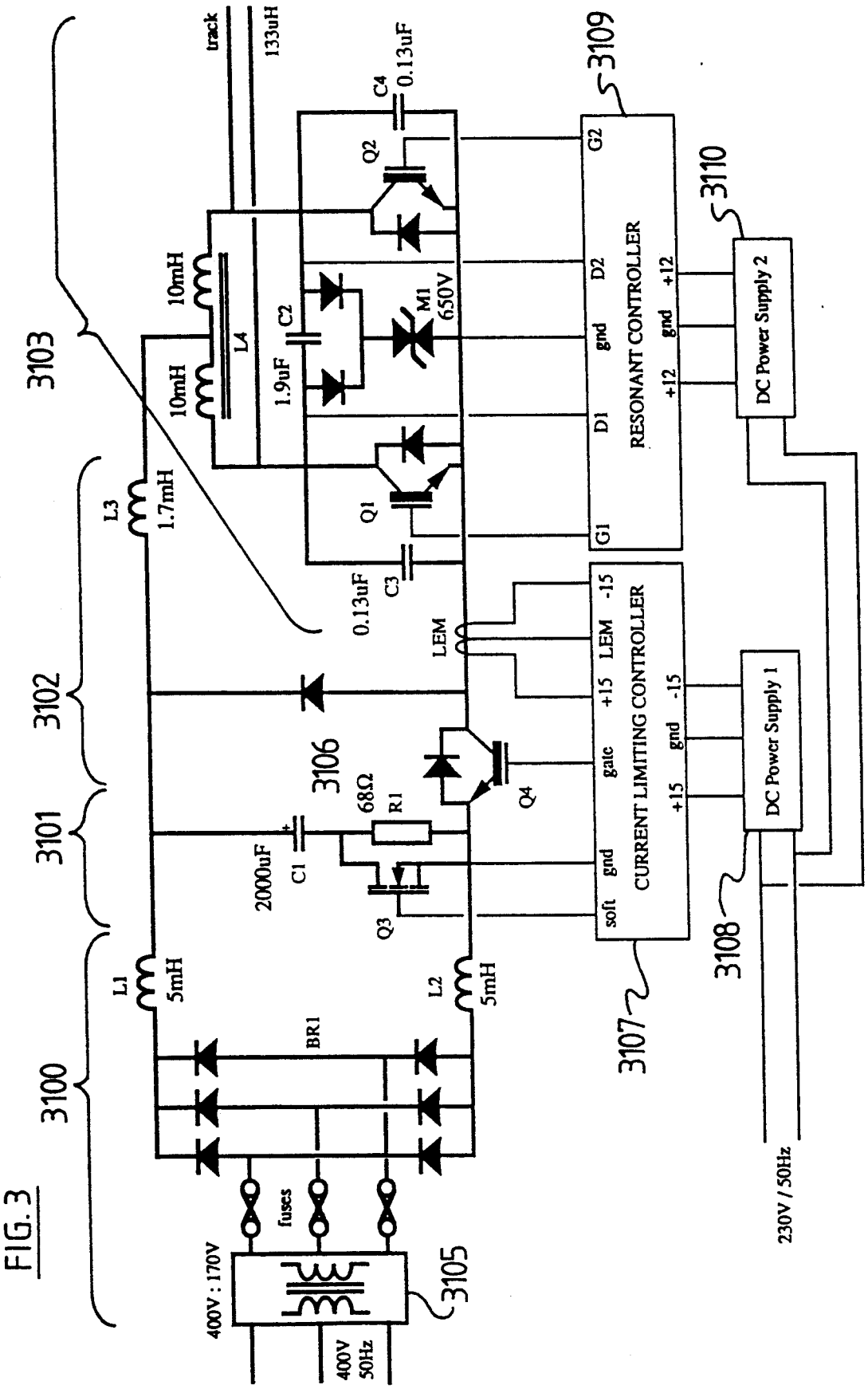
Figure 4:
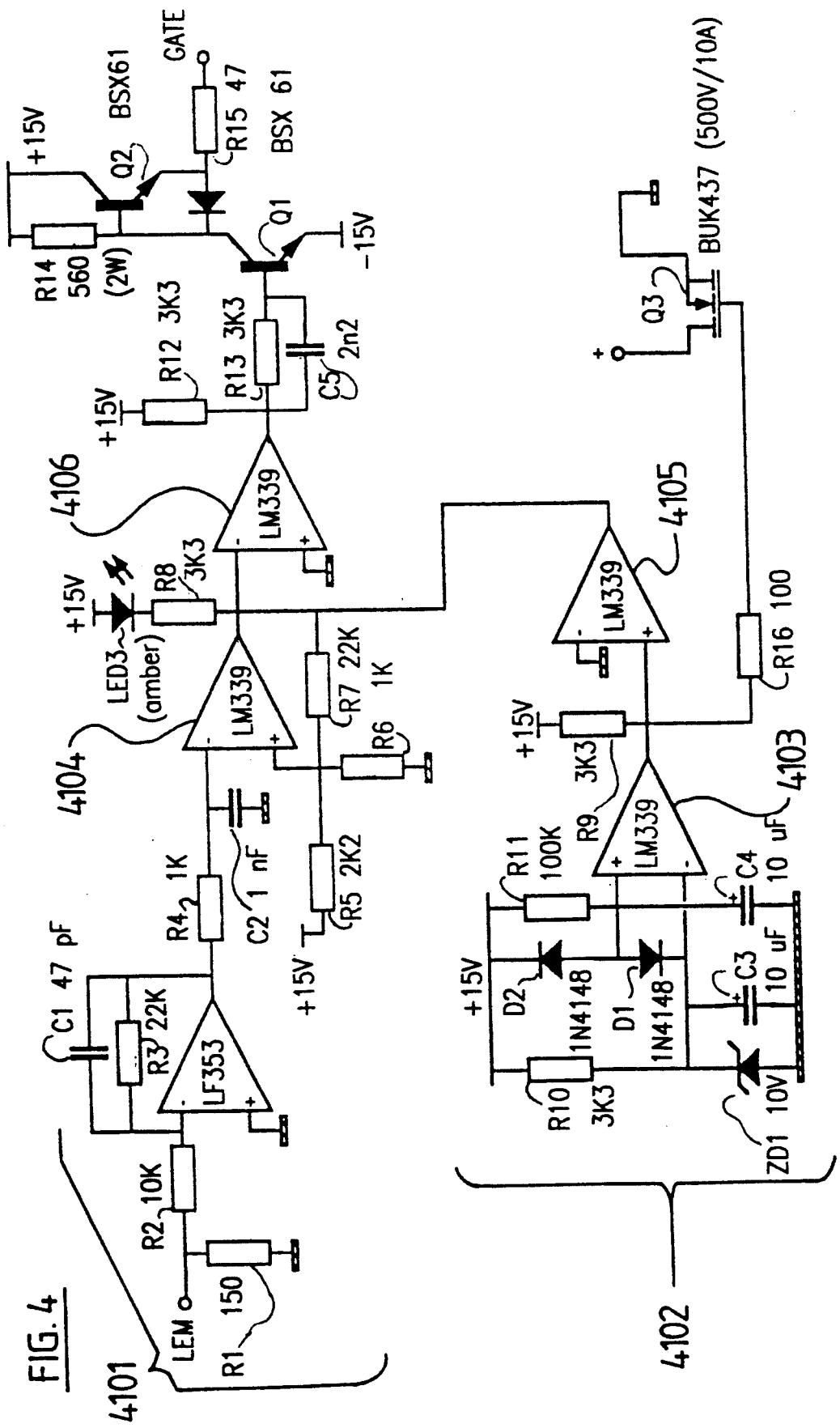
Figure 5:
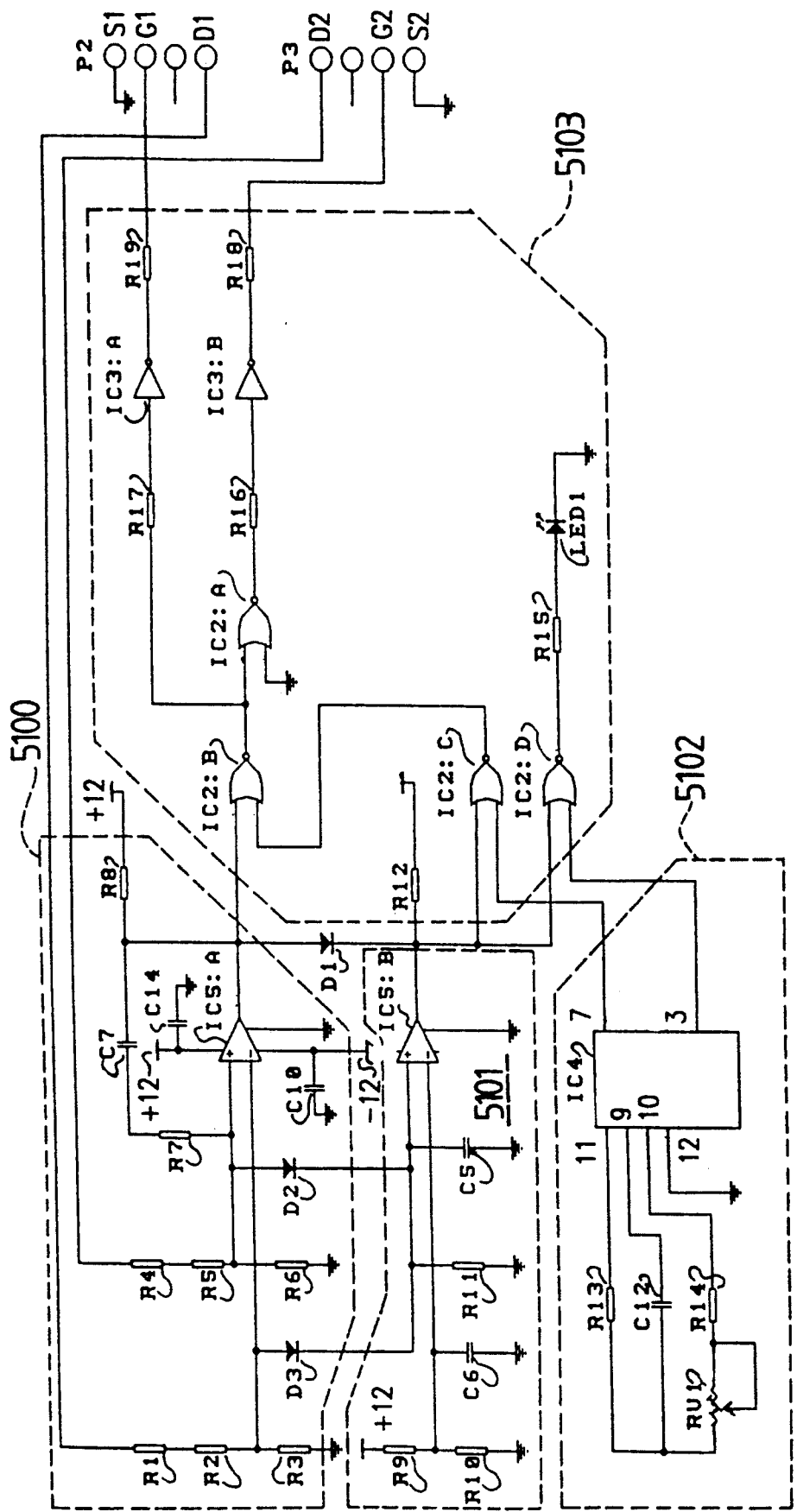
Figures 6, 7:
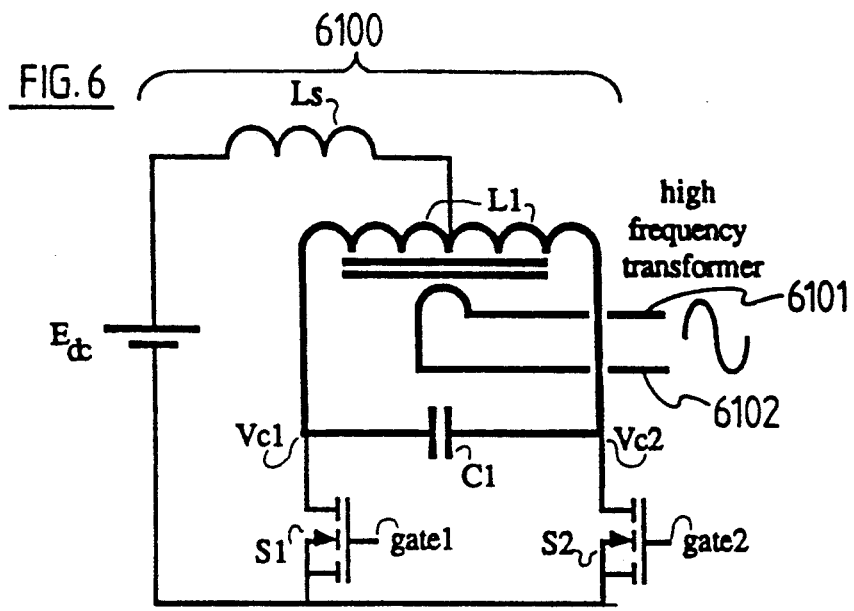
Figure 8:
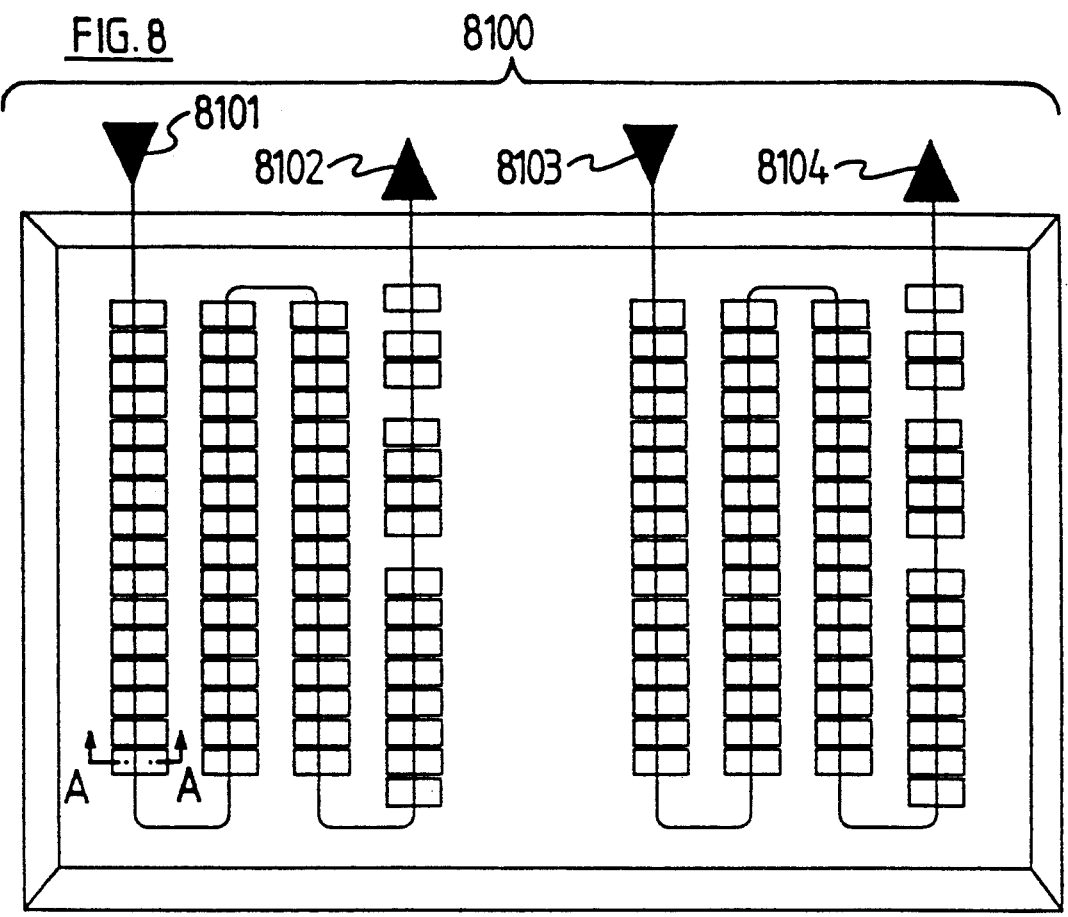
Figure 9:
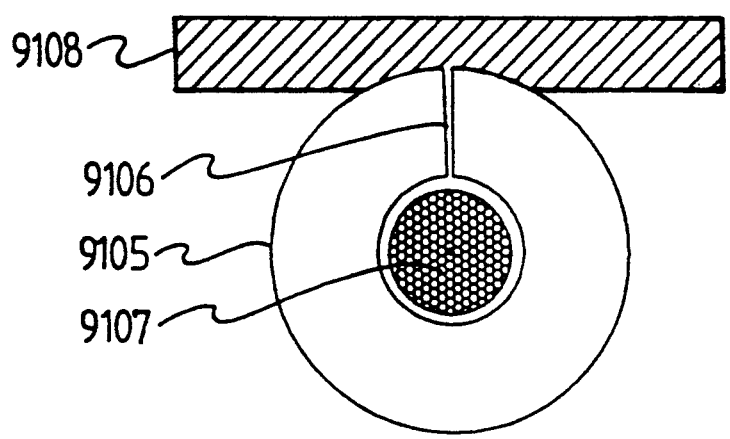
Figure 10:
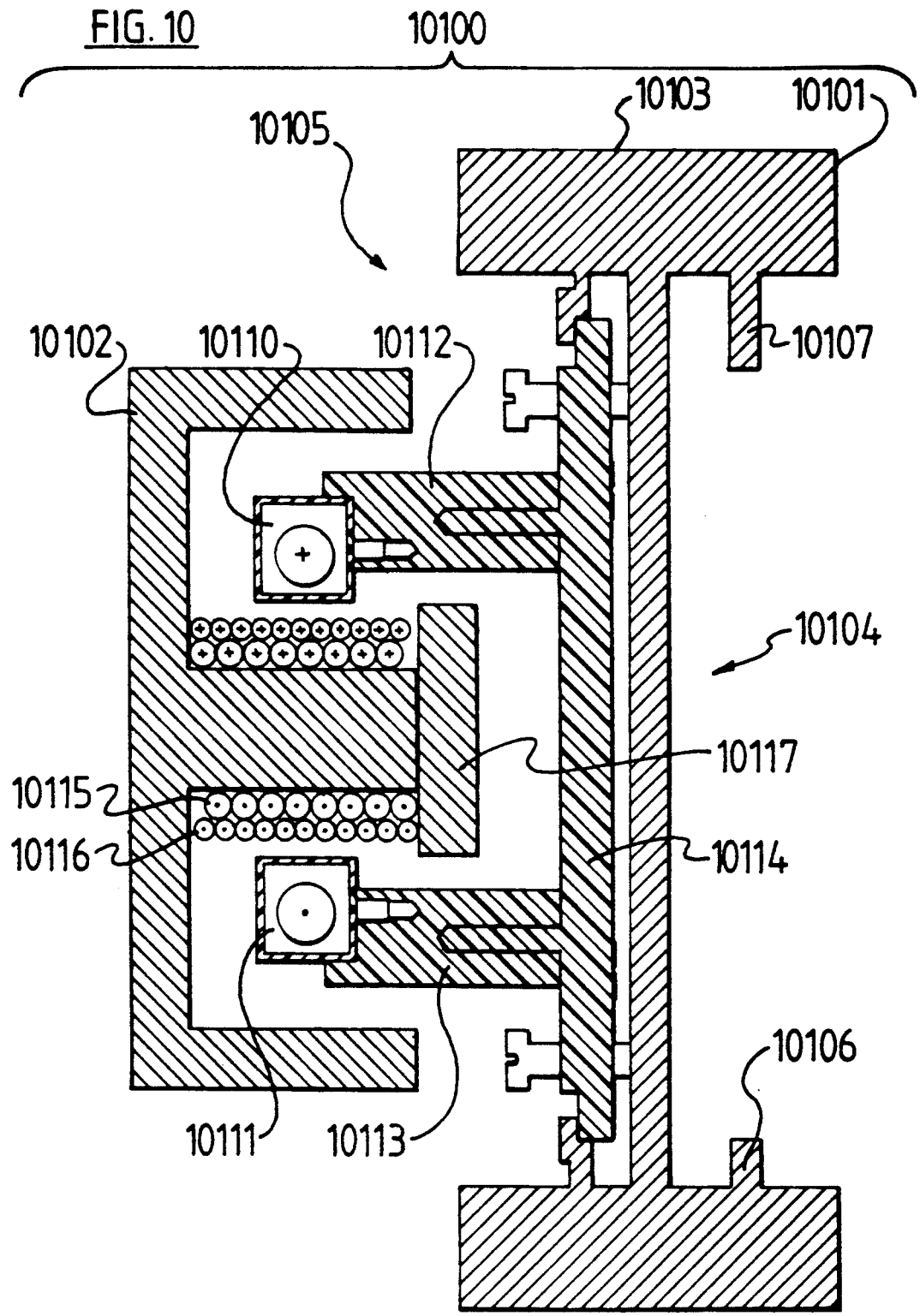
Figure 11:
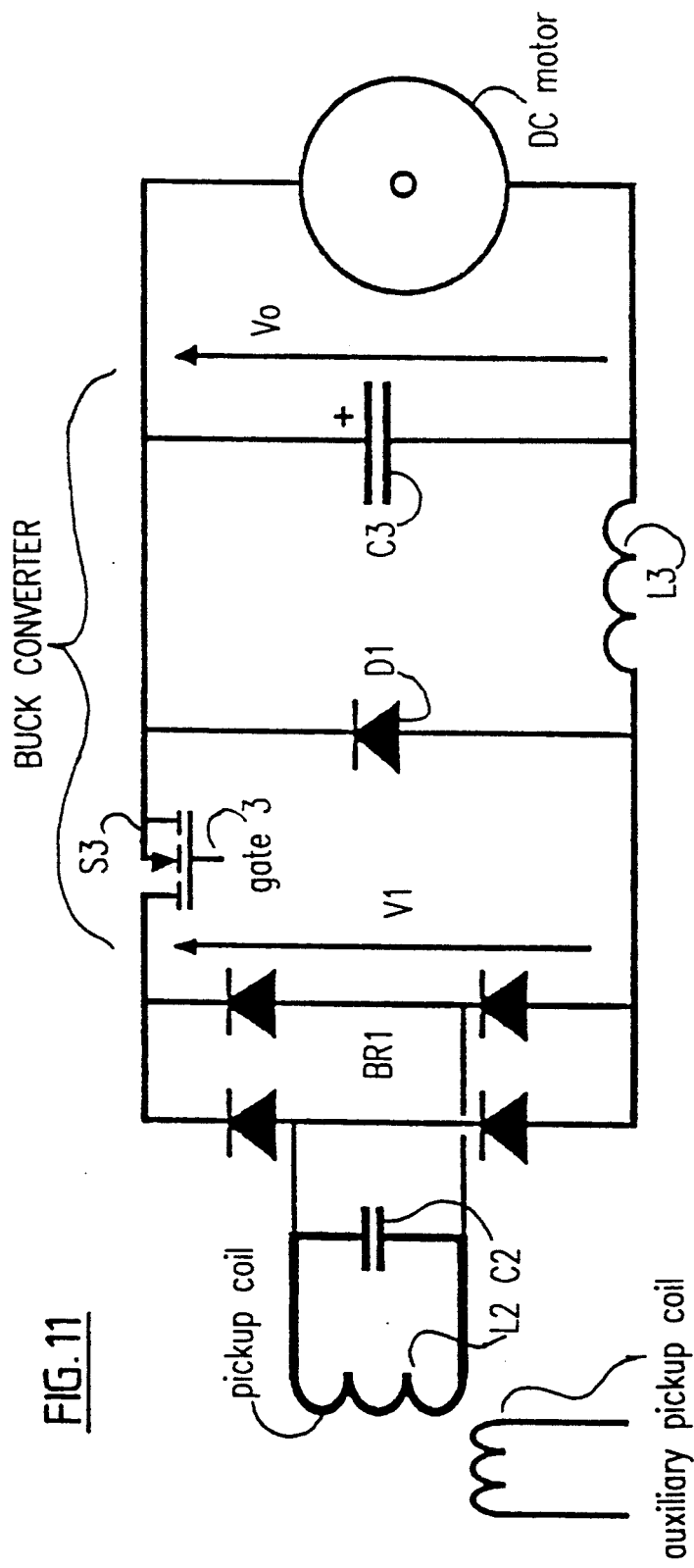
Figure 12:
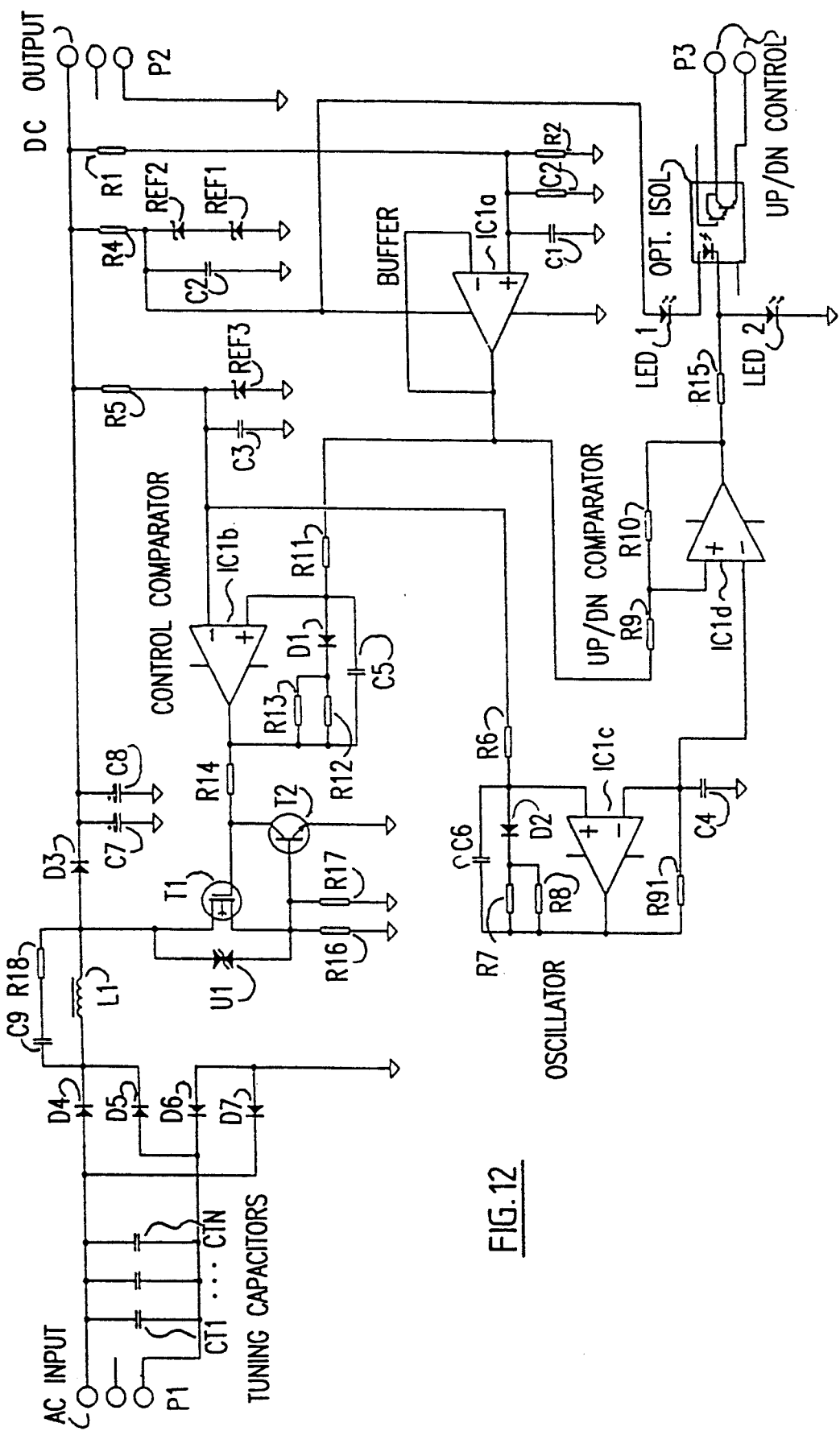
Figure 13:
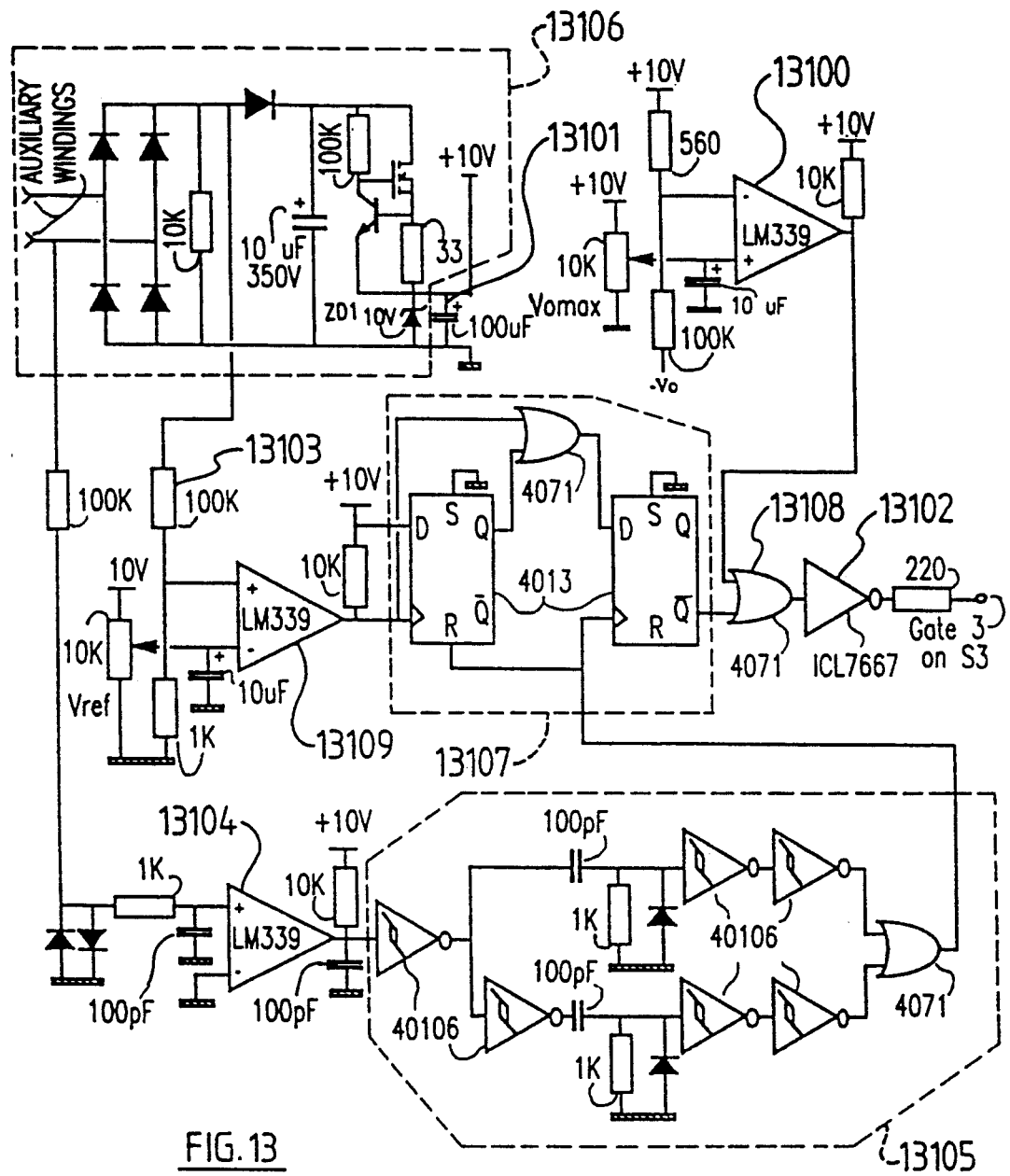
Figure 14:
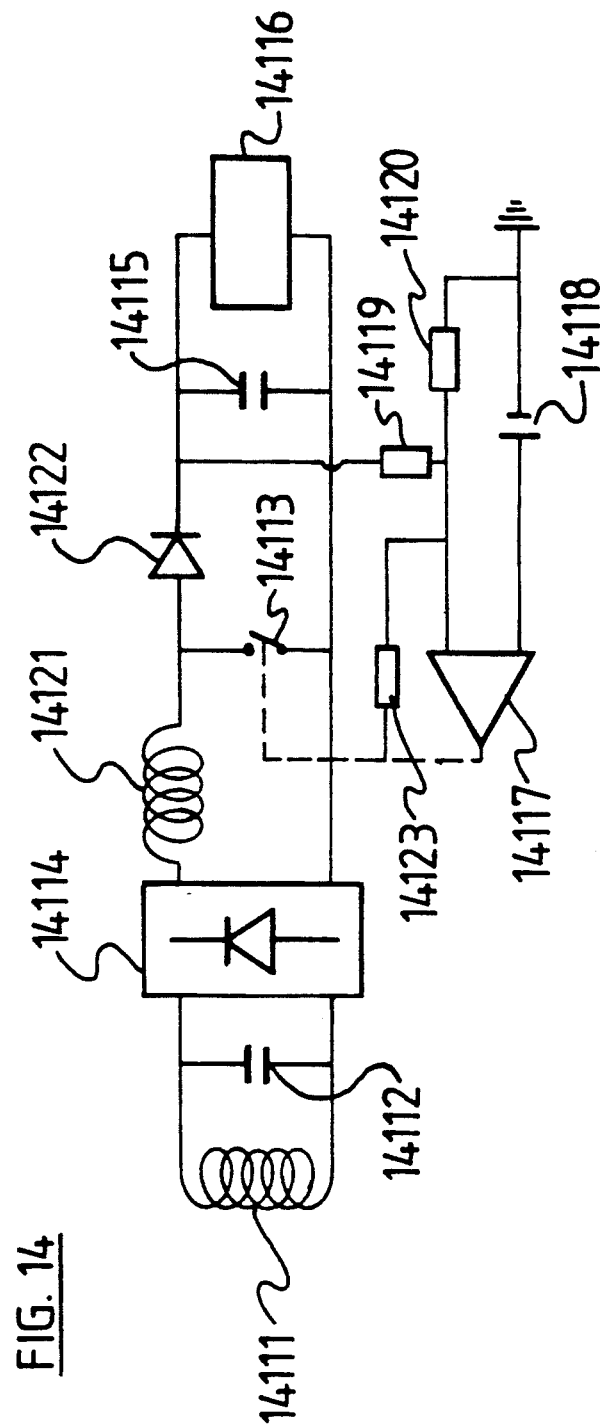
Figure 15:
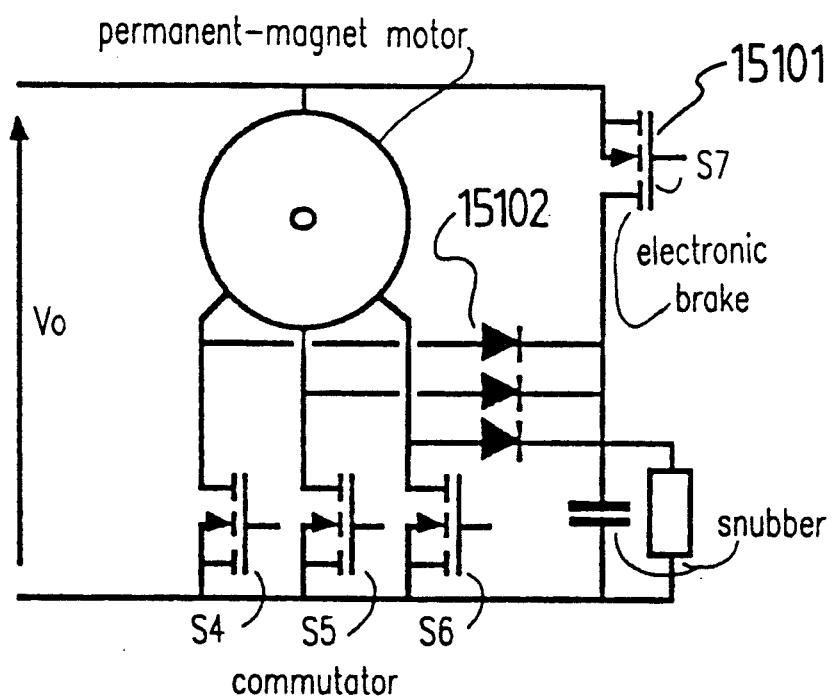
Figure 16:
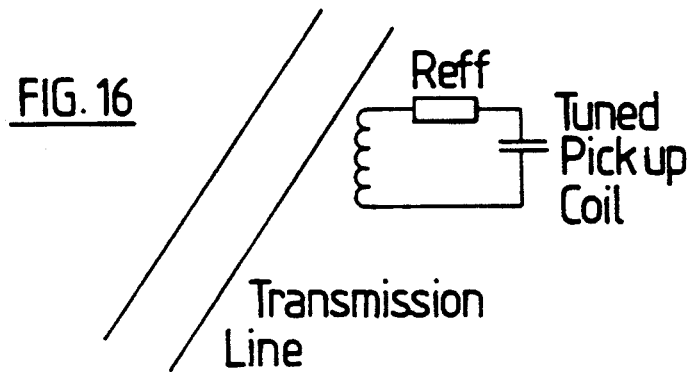
Figure 17:
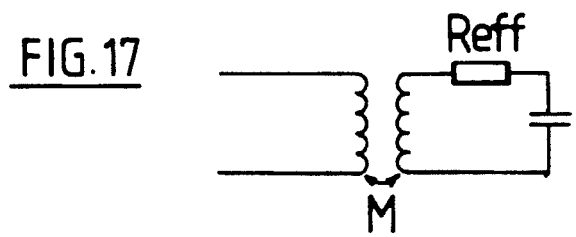
Figure 18:
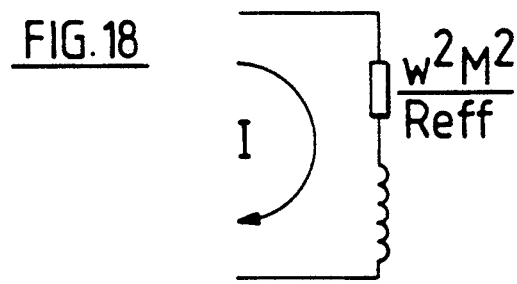
Figure 19:
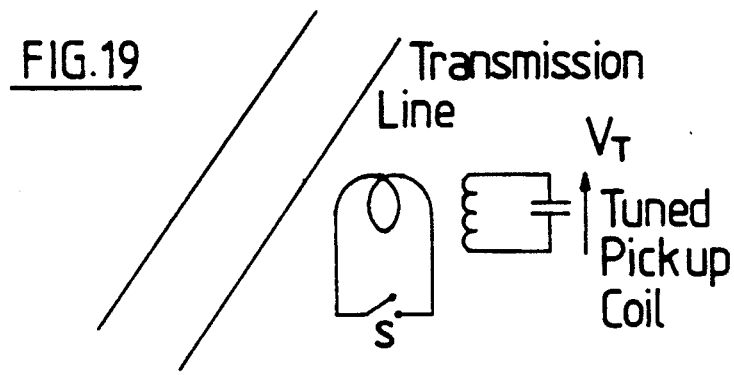
Figure 20:
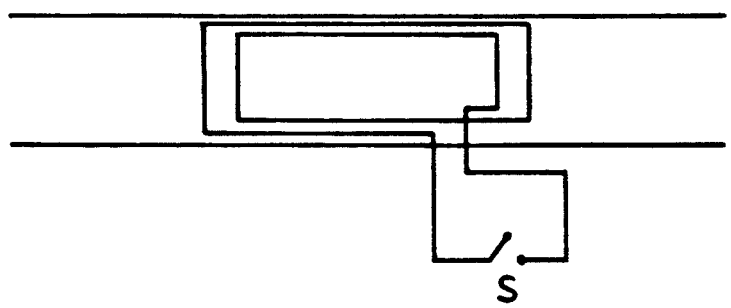
Figure 21:
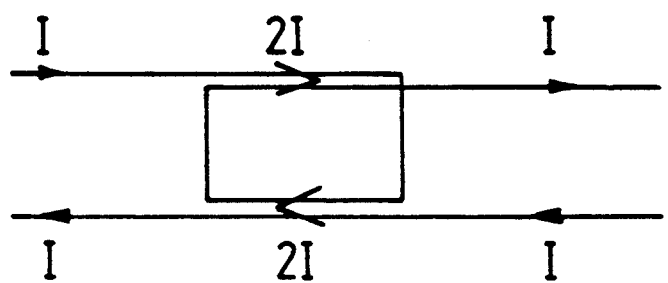
Figure 22:
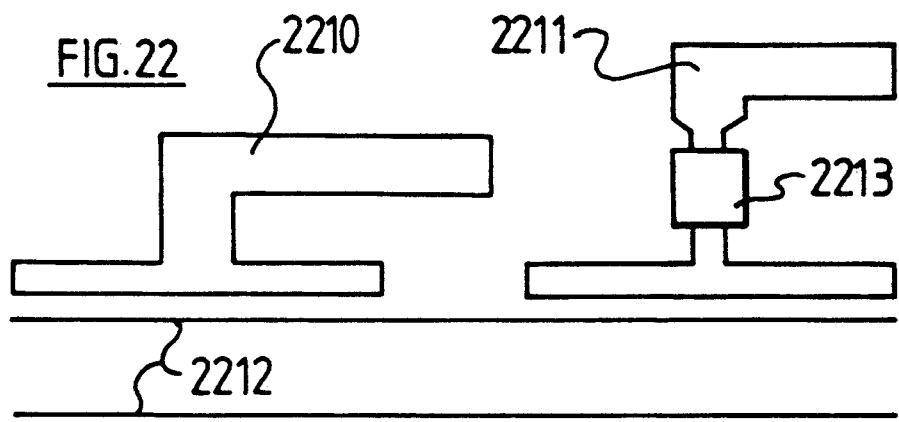
FIG. 22 shows how secondary tracks 2210, 2211 may be powered from the primary track 2212 using pick-up coils directly connected to the secondary track conductors, and inductively coupled to the primary track conductors. If a different current magnitude or frequency is required in the secondary track then an additional power converter may be used as shown in 2213.
Figure 23:
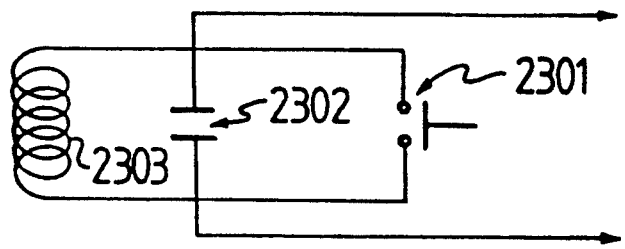
FIG. 23 shows a switch 2301 in parallel with the capacitor 2302 of the pick-up coil 2303. Closing the switch 2301 renders the circuit non-resonant and thus reduces the power coupled between the primary (not shown) and the pick-up coil 2303.
Figure 24:
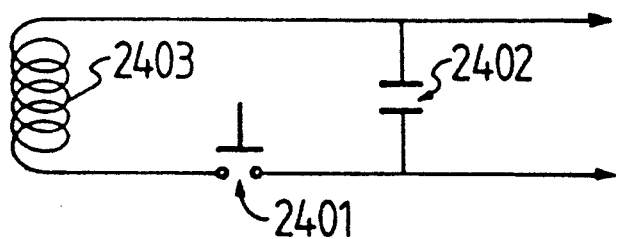

FIG. 24 shows a less preferred arrangement in which a switch 2401 is in series with capacitor 2402 and an inductor 2403 so that when the switch is opened, resonant current is prevented from flowing.

Figure 25:
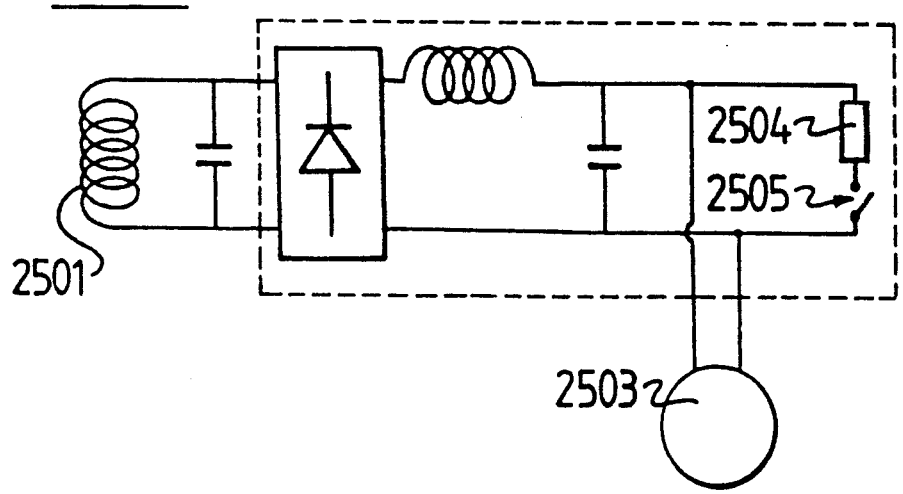

FIG. 25 shows a complementary load circuit. This has a pick-up coil 2501 having a controller 2502 supplying a DC output to a main device 2503 (such as an electric motor).

A complementary load in the form of a resistor 2504 is controlled by a switch 2505. This can be a pulse width modulated device to control the amount of time that the resistor 2504 is switched on to ensure that the pick-up will always experience a full load, even though the main device 2503 may be lightly loaded. Such an arrangement is useful at lower power applications but becomes inefficient at higher power applications as the primary power supply has to supply full power all the time.

FIG. 26–28 show other variations, including a battery charger (FIG. 26), an incandescent lighting installation (FIG. 27) and a fluorescent lighting installation (FIG. 28). Primary conductors 2601, 2701, 2801 supply power to movable devices 2602, 2702, 2802 which can be moved towards and away from the primary conductors to charge the power coupled to each device.

The battery charger can provide constant current to the batteries 2603 by means of the controller 2604 which can be the same as the vehicle controller described above.

Similarly FIG. 27 shows an incandescent lamp 2703 in place of the batteries. The lamp can be supplied with the required DC voltage to correspond to the local mains (AC) voltage. Hence the output could be set to 230 V DC for New Zealand to make use of lighting fittings adapted for the local 230 V AC power supply.

It is preferred that the incandescent lamp is supplied with DC to avoid problems which might occur with the inductance of the lamp at the power supply frequency. By moving the light fitting towards or away from the primary, the amount of power coupled to the pick-up coil can be varied.

FIG. 28 shows a fluorescent light fitting 2801 supplied by the high frequency AC received by the pick-up coil 2802.

Various alterations and modifications may be made to the foregoing without departing from the scope of this invention, as set forth in the following claims.

We claim:

1. An inductive power distribution system comprising:
   an electric power supply,
   a primary conductive path connected to said electric power supply;
   one or more electrical devices for use in conjunction with said primary conductive path; the or each device capable of deriving at least some power from a magnetic field associated with said primary conductive path;
   the or each device having at least one pick-up coil comprising a resonant circuit having a pick-up resonant frequency, and at least one output load capable of being driven by electric power induced in the pick-up coil, wherein the or each device comprises control means to at least partly decouple said pick-up coil from said primary conductive path.

2. An inductive power distribution system as claimed in claim 1, wherein said control means includes means to decouple said pick-up coil intermittently.

3. An inductive power distribution system as claimed in claim 2, wherein a period in which said pick-up coil is not decoupled includes many cycles of the resonant frequency of said resonant circuit.

4. An inductive power distribution system as claimed in claim 1, wherein the the one or more electrical devices are mobile or portable devices.

5. An inductive power distribution system as claimed in claim 1, wherein the control means comprises means for changing the power coupled between the primary conductive path and the pick-up coil.

6. An inductive power distribution system as claimed in claim 5, wherein the output load comprises a battery charger supplying power to one or more batteries.

7. An inductive power distribution system as claimed in claim 5, wherein the primary conductive path comprises a resonant circuit having a primary resonant frequency substantially the same as the pick-up resonant frequency.

8. An inductive power distribution system as claimed in claim 5, wherein the means for changing the power coupled between the primary conductive path and the pick-up coil is mounted on the device, or where there is more than one device, similar means is mounted on each device.

9. An inductive power distribution system as claimed in claim 5, wherein the means for changing the power coupled between the primary conductive path and the pick-up coil comprises means for physically moving the pick-up coil away from or towards the primary conductive path.

10. An inductive power distribution system as claimed in claim 5, wherein the means for changing the power coupled between the primary conductive path and the pick-up coil comprises an isolating coil, said isolating coil having a switch to switch the coil between an open circuit and a short circuit, so that when the switch is switched from one state to another state the power coupled between the primary conductive path and the pick-up coil is changed.

11. An inductive power distribution system as claimed in claim 10, wherein the isolating coil is mounted on or in close proximity to the primary conductive path.

12. An inductive power distribution system as claimed in claim 10, wherein an isolating coil is mounted on the or each device.

13. An inductive power distribution system as claimed in claim 5, wherein the pick-up resonant circuit comprises a capacitor and an inductor, and the means for changing the power coupled between the primary conductive path and the pick-up coil comprises a switch in series with the capacitor to switch the circuit between a resonant circuit and an open circuit, so that when the switch is open circuited, resonant current is prevented from flowing in the pick-up coil.

14. An inductive power distribution system as claimed in claim 5, wherein the means for changing the power coupled between the primary conductive path and the pick-up coil comprises a switch across the pick-up coil to switch the pick-up coil between a resonant circuit and a short circuit, so that when the coil is short circuited, resonant current is prevented from flowing in the pick-up coil.

15. An inductive power distribution system as claimed in claim 5, wherein the power supply is electrically tunable.

16. An inductive power distribution system as claimed in claim 7, wherein the power supply in combination with the primary resonant circuit is adapted to produce a sinusoidal alternating current of a frequency substantially the same as that of the primary resonant frequency.

17. An inductive power distribution system as claimed in claim 16, wherein the power supply comprises a switching converter having at least one switch, means for detecting a phase of the power in the resonant primary conductive path, and means for controlling said switch connected to said means for detecting the phase in the resonant primary conductive path, whereby in use the at least one switch is phase locked to the phase of the resonant power in the resonant primary conductive path.

18. An inductive power distribution system as claimed in claim 17, wherein the power supply is a single phase power supply, and said at least one switch comprises at least one pair of complementary switches.

19. An inductive power distribution system as claimed in claim 5, wherein the pick-up resonant circuit is a series resonant circuit having at least one capacitor and at least one inductor.

20. An inductive power distribution system as claimed in claim 5, wherein the pick-up resonant circuit is a parallel resonant circuit having at least one capacitor and at least one inductor.

21. An inductive power distribution system as claimed in claim 20, wherein the inductor has a magnetically permeable core.

22. An inductive power distribution system as claimed in claim 5, wherein the device is selected from the group comprising vehicles, electrical appliances, electrical hand tools, electrical machinery, battery chargers, or light fittings.

23. An inductive power distribution system comprising:
an electric power supply;
a primary conductive path connected to said electric power supply;
one or more vehicles for use in conjunction with said primary conductive path; the or each vehicle capable of deriving at least some of its power from a magnetic field associated with said primary conductive path;
the or each vehicle having at least one pick-up coil comprising a resonant circuit having a pick-up resonant frequency, and at least one output load capable of being driven by electric power induced in the pick-up coil, and wherein the or each device comprises control means to at least partly decouple said pick-up coils from said primary conductive path.

24. An inductive power distribution system as claimed in claim 23, wherein the at least one output load comprises an electrical appliance mounted on said vehicle.

25. An inductive power distribution system as claimed in claim 23, wherein the at least one output load comprises means for levitating said vehicle relative to said primary conductive path.

26. An inductive power distribution system as claimed in claim 23, wherein the at least one output load comprises at least one electric motor on said vehicle.

27. An inductive power distribution system as claimed in claim 26, wherein the pick-up resonant circuit is a series resonant circuit having at least one capacitor and at least one inductor.

28. An inductive power distribution system as claimed in claim 26, wherein the pick-up resonant circuit is a parallel resonant circuit having at least one capacitor and at least one inductor.

29. An inductive power distribution system as claimed in claim 28, wherein the means for changing the power coupled between the primary conductive path and the pick-up coil comprises an isolating coil on the vehicle, said isolating coil having a switch to switch the isolating coil between an open circuit and a short circuit, so that when the switch is switched from one state to another state the power coupled between the primary conductive path and the pick-up coil is changed.

30. An inductive power distribution system as claimed in claim 29, wherein there is means for controlling said switch and means for monitoring the voltage across the capacitor and the inductor, so that if (a) the voltage exceeds an upper predetermined value, the control means switches the switch from an open circuit state to a short circuit state to allow the voltage to drop below the upper predetermined value, or if (b) the voltage falls below a lower predetermined value, the control means switches the switch from a short circuit state to an open circuit state.

31. An inductive power distribution system as claimed in claim 28, wherein the means for changing the power coupled between the primary conductive path and the pick-up coil comprises a switch in the pick-up coil to switch the pick-up coil between a resonant state and a non-resonant state.

32. An inductive power distribution system as claimed in claim 31, wherein there is means for controlling said switch and means for monitoring the voltage across the capacitor and the inductor, so that if (a) the voltage exceeds an upper predetermined value, the control means switches the switch from a resonant state to a non-resonant state to allow the voltage to drop below the upper predetermined value, or if (b) the voltage falls below a lower predetermined value, the control means switches the switch from a non-resonant state to a resonant state.

33. An inductive power distribution system as claimed in claim 31, wherein the switch is in series with said capacitor and said inductor.

34. An inductive power distribution system as claimed in claim 31, wherein the switch is in parallel with said capacitor and said inductor.

35. An inductive power distribution system as claimed in claim 23, wherein the primary conductive path comprises a single primary conductor.

36. An inductive power distribution system as claimed in claim 23, wherein the primary conductive path comprises a pair of spaced apart substantially parallel conductors.

37. An inductive power distribution system as claimed in claim 23, wherein the primary conductive path comprises at least one strand of elongate conductive material having a relatively large surface area available for the carriage of high-frequency current.

38. An inductive power distribution system as claimed in claim 37, wherein the primary conductive path includes one or more regions having additional primary conductors so that in use said regions possess enhanced magnetic fields.

39. An inductive power distribution system as claimed in claim 23, wherein the primary conductive path comprises a primary resonant circuit having a primary resonant frequency substantially the same as the pick-up resonant frequency, said primary resonant circuit comprises a pair of spaced apart elongate conductors connected to at least one capacitor to form a closed loop.

40. An inductive power distribution system as claimed in claim 39, wherein the primary conductive path is terminated by an additional capacitor.

41. An inductive power distribution system as claimed in claim 39, wherein the primary conductive path is terminated by a conductive element.

42. An inductive power distribution system as claimed in claim 39, wherein there is means for tuning the primary resonant frequency to a particular frequency, said tuning means comprising one or more magnetically permeable bodies which may be moved into close proximity to or removed from close proximity to the primary conductive path to change the inductance of the primary resonant circuit.

43. A vehicle capable of deriving some of its power from a magnetic field associated with a primary conductive path supplied by a varying electric current, said vehicle having at least one pick-up coil comprising a pick-up coil comprising a resonant circuit having a pick-up resonant frequency, and at least one output load capable of being driven by electric power induced in the pick-up coil, wherein there is means for changing the power coupled between the primary conductive path and the pick-up coil.

44. An inductive power distribution system comprising:
- an electric power supply;
- a primary conductive path connected to said electric power supply;
- one or more electrical devices for use in conjunction with said primary conductive path; the or each device capable of deriving at least some power from a magnetic field associated with said primary conductive path;
- the or each device having at least one pick-up coil comprising a resonant circuit having a pick-up resonant frequency, and at least one output load capable of being driven by electric power induced in the pick-up coil, and including control means to vary the coupling between said pick-up coil and said primary conductive path.

* * * * *